United States Patent
Harada et al.

(10) Patent No.: US 6,272,466 B1
(45) Date of Patent: Aug. 7, 2001

(54) SPEECH DETECTION APPARATUS USING SPECULARLY REFLECTED LIGHT

(75) Inventors: Masaaki Harada; Shin Takeuchi; Motofumi Fukui; Tadashi Shimizu, all of Ashigarakami-gun (JP)

(73) Assignee: Fuji Xerox Co., LTD, Tokyo (JP)

( * ) Notice: Subject to any disclaimer, the term of this patent is extended or adjusted under 35 U.S.C. 154(b) by 0 days.

(21) Appl. No.: 09/032,979

(22) Filed: Mar. 2, 1998

(30) Foreign Application Priority Data

Mar. 4, 1997 (JP) .................................................. 9-048839

(51) Int. Cl.[7] .................................................. G10L 21/00
(52) U.S. Cl. ........................ 704/270; 704/271; 704/275
(58) Field of Search .................................. 704/270, 271, 704/275, 276; 128/200.26, 200.15, 207.15; 623/9; 607/108; 382/118

(56) References Cited

U.S. PATENT DOCUMENTS

| | | | |
|---|---|---|---|
| H1496 | * 10/1995 | Marshall | 704/275 |
| 4,063,035 | * 12/1977 | Appelman et al. | 704/270 |
| 4,571,739 | * 2/1986 | Resnick | 381/70 |
| 4,586,931 | * 5/1986 | Blom et al. | 623/9 |
| 4,633,864 | * 1/1987 | Walsh | 128/207.15 |
| 4,718,096 | * 1/1988 | Meisel | 704/500 |
| 4,726,066 | * 2/1988 | Bloomfield, III | 704/271 |
| 4,769,845 | * 9/1988 | Nakamura | 704/275 |
| 4,862,503 | * 8/1989 | Rothenberg | 704/270 |
| 4,975,960 | * 12/1990 | Petajan | 704/275 |

(List continued on next page.)

FOREIGN PATENT DOCUMENTS

| | | |
|---|---|---|
| 52-112205 | 9/1977 | (JP) . |
| 55-121499 | 9/1980 | (JP) . |
| 57-160440 | 10/1982 | (JP) . |
| 60-3793 | 1/1985 | (JP) . |
| 62-239231 | 10/1987 | (JP) . |

(List continued on next page.)

OTHER PUBLICATIONS

Basu et al., ("3D Modeling and tracking of human lip motions", Sixth International Conference on Computer Vision 1998, Jan. 4–7, 1998, pp. 337–343).*

Bergler, Christoph, et al. *Improving Connected Letter Recognition by Lipreading*, IEEE 1993, pp. I–557–I–560.

*A Phisiological Model for the Synthesis of Lip Articulation* (in Japanese language), (1994), pp. 465–473.

Stork, David G., et al., *Neural Network Lipreading System for Improved Speech Recognition*, 1992 IEEE, pp. II–285–II–295.

Murakami, Jinichi, et al., *A Discussion of Acoustic Problems in Spontaneous Speech Recognition*, Dec. 1995, vol. J78–d–II No. 12, pp. 1741–1749.

*Primary Examiner*—William Korzuch
*Assistant Examiner*—Vijay Chawan
(74) *Attorney, Agent, or Firm*—Oliff & Berridge, PLC

(57) ABSTRACT

As a speaker produces a sound, the positions and angles of specular reflection plates put on the skin of the vocal organs and periphery thereof change. Resultantly, a ray of light applied from a light source section is reflected by the specular reflection plates uniquely in accordance with a law of reflection and the direction of the ray of light changes. Specularly reflected light spots moving on the face of a position detection sensor are detected by the position detection sensor, thereby detecting the positions of the specularly reflected light spots corresponding to the shape of the vocal organs and periphery thereof produced as the speaker produces the sound. Time characteristic and position change features are extracted based on the specularly reflected light spot positions detected. The features are compared with standard features patterns, thereby classifying input voice.

18 Claims, 30 Drawing Sheets

U.S. PATENT DOCUMENTS

| | | | |
|---|---|---|---|
| 5,035,242 | * | 7/1991 | Franklin et al. .................. 128/420.5 |
| 5,147,205 | * | 9/1992 | Gross et al. ......................... 434/169 |
| 5,621,858 | * | 4/1997 | Stork et al. .......................... 704/232 |
| 5,689,575 | * | 11/1997 | Sako et al. ........................... 382/118 |
| 5,884,257 | * | 3/1999 | Maekawa et al. ................... 704/248 |
| 5,907,353 | * | 5/1999 | Okauchi ............................... 348/218 |
| 5,943,233 | * | 8/1999 | Ebina et al. ......................... 364/190 |
| 6,014,625 | * | 1/2000 | Lee ....................................... 704/270 |
| 6,101,359 | * | 8/2000 | Tamura ................................ 399/301 |

FOREIGN PATENT DOCUMENTS

| | | | |
|---|---|---|---|
| 64-62123 | | 3/1989 | (JP) . |
| 3-40177 | | 2/1991 | (JP) . |
| 4-257900 | | 9/1992 | (JP) . |
| 6-12483 | | 1/1994 | (JP) . |
| 6-43897 | | 2/1994 | (JP) . |
| 7-306692 | | 11/1995 | (JP) . |
| 8-187368 | | 7/1996 | (JP) . |
| 8-305277 | | 11/1996 | (JP) . |
| WO 87/07497 | * | 12/1987 | (SE) ................................ A61F/4/00 |
| WO 91/17522 | * | 11/1991 | (WO) ............................ G06K/11/18 |

* cited by examiner

☐ PLACEMENT POSITIONS OF SPECULAR REFLECTION PLATES 12

RELATIONSHIP BETWEEN POSITION MOTION AND ANGLE MOTION

121:NASAL PART
122:ORAL PART
123:MENTAL REGION
124:INFRAORBITAL REGION
125:BUCCA PART
126:CHEEKBONE PART
127:PAROTIDEOMASSETERIC REGION
128:HYOID UPPER PART
129:SUBMANDIBULAR TRIANGLE
130:RETROMANDIBULAR FOSSA
131:CAROTID TRIANGLE
132:NECK MEDIAN PART
133:STERNOCLEIDOMASTOID REGION
134:LATERAL CERVICAL TRIANGLE PART

SPECULAR REFLECTION PLATE PLACEMENT POSITIONS-LIP MEDIAN INNER PERIPHERAL UPPER AND LOWER PARTS

SPECULAR REFLECTION PLATE PLACEMENT POSITIONS-LIP MEDIAN OUTER PERIPHERAL UPPER AND LOWER PARTS

FIG.15
SPECULAR REFLECTION PLATE PLACEMENT POSITIONS-LIP MEDIAN OUTER PERIPHERAL UPPER AND LOWER PARTS
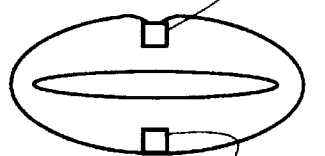
SPECULAR REFLECTION PLATE
a1(51) : LIP MEDIAN OUTER PERIPHERAL UPPER PART
SPECULAR REFLECTION PLATE
a2(52) : LIP MEDIAN OUTER PERIPHERAL LOWER PART
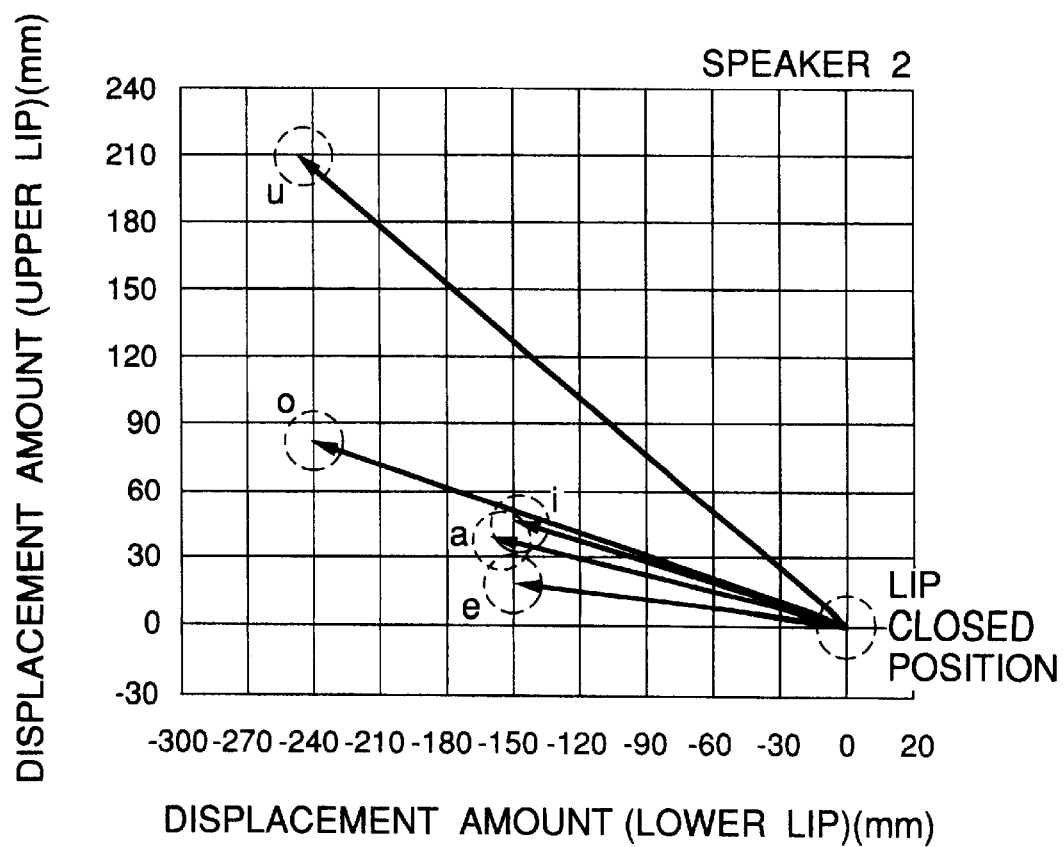

FIG.18
SPECULAR REFLECTION PLATE PLACEMENT POSITION-LOWER JAW PART
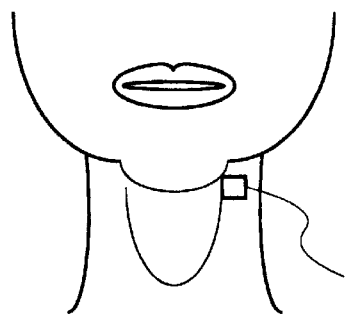
SPECULAR REFLECTION PLATE
e(58) : LOWER JAW PART
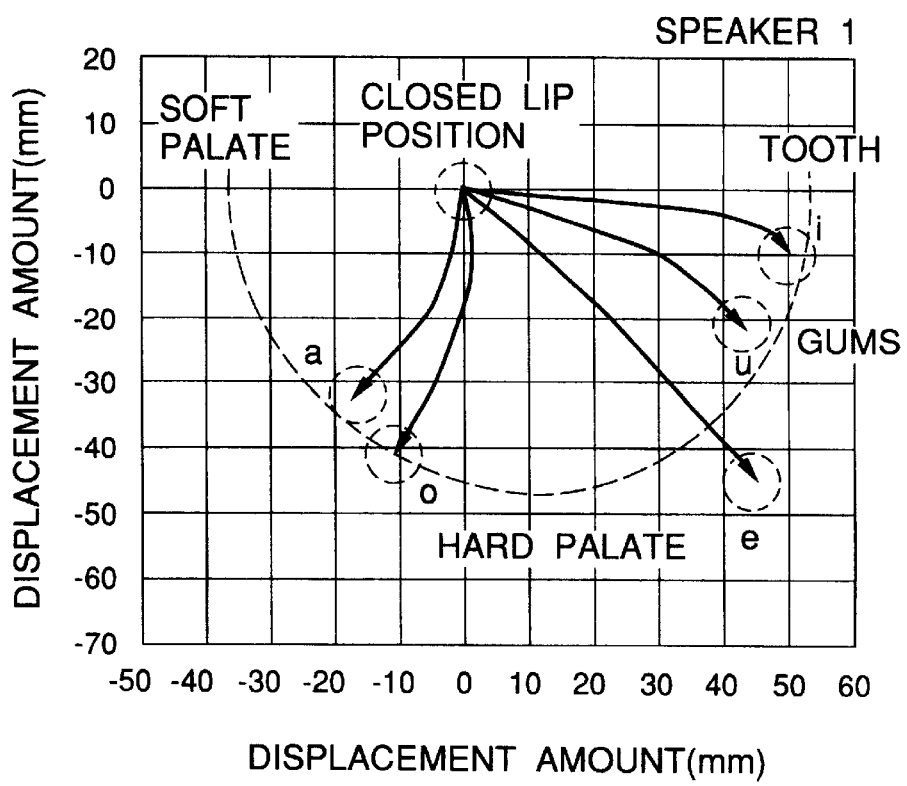

ENLARGED VIEW

ENLARGED VIEW

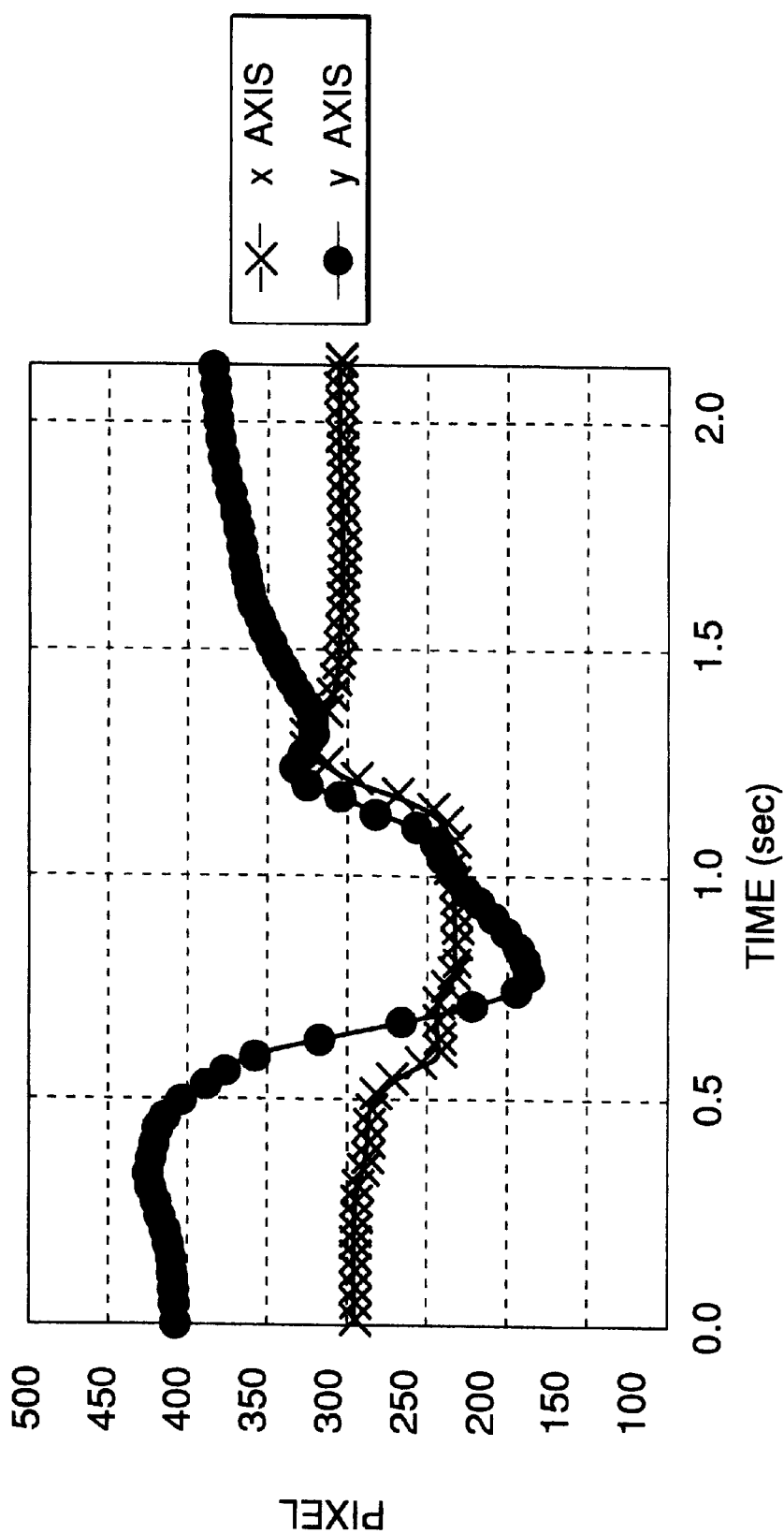

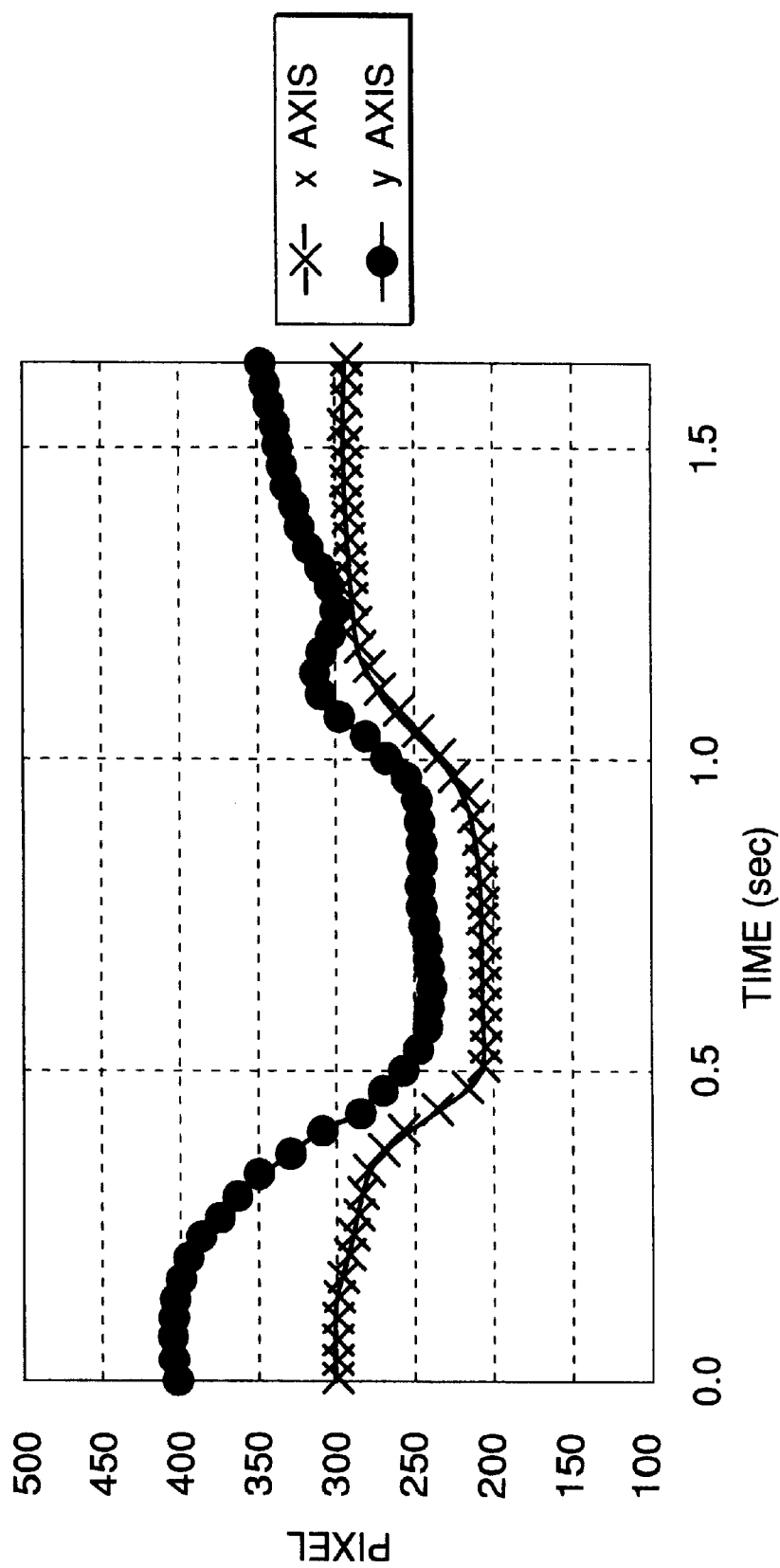
FIG.31 WAVEFORM OF "T"

SPEECH DETECTION APPARATUS USING SPECULARLY REFLECTED LIGHT

BACKGROUND OF THE INVENTION

This invention relates to a technology used in a field wherein voice information is coded and input to an information machine such as a computer or a wordprocessor, and in particular is appropriate for detecting voice information in a noisy environment or a conference, etc., where many people talk at the same time. The technology is also used as a voice input apparatus for providing barrier-free machines enabling smooth information transmission to deaf-and-dumb persons, hard-of-hearing persons, and aged people.

The voice input apparatus of a machine aims at enabling user's voice to be input precisely and moreover at high speed in any environment. Hitherto, breath apparatuses for analyzing voice frequency, thereby recognizing and processing speech have been proposed. However, in such a speech recognition technique, degradation of the recognition percentage in an environment wherein noise occurs is at stake. To prevent this problem, it is desirable to get utterance information from information other than voice. Human being vocal organs involved directly in producing a voice are lungs 901 of an air stream mechanism, a larynx 902 of a voice producing mechanism, an oral cavity 903 and nasal cavity 904 are taking charge of ora-nasal process, and lips 905 and a tongue 906 governing articulation process, as shown in FIG. 9, although the classification varies from one technical document to another. Research on getting utterance information from visual information of the lips 905 has been conducted as a technology for hearing handicapped persons. Further, it is pointed out that speech recognition accuracy is enhanced by adding visual information of a motion of the lips 905 of the speaker to voice information (C. Bregler, H. Hild, S. Manke and A. Waible, "Improving connected letter recognition by lipreading," Proc. IEEE ICASSP, pp. 557–560, 1993, etc.,).

An image processing technique using images input through a video camera is most general as a breath recognition technique based on visual information of lips. For example, in the Unexamined Japanese Patent Application Publication No. Hei 6-43897, images of ten diffuse reflective markers M0, M1, M2, M3, M4, M5, M6, M7, M8, and M9 attached to the lips 905 of a speaker and the surroundings of the lips are input to a video camera, two-dimensional motion of the markers is detected, five lip feature vector components 101, 102, 103, 104, and 105 are found, and lip motion is observed (FIG. 10). In the Unexamined Japanese Patent Application Publication No. Sho 52-112205, positions of black markers put on lips and periphery thereof are read from on video camera scanning lines for improving speech recognition accuracy. Although no specific description on a marker extraction method is given, the technique requires two-dimensional image preprocessing and feature extraction technique for discriminating density differences caused by shadows produced by a nose and lips, mustache, beard, whiskers, and skin color differences, and moles, scars, etc., from markers. To solve this problem, in the Unexamined Japanese Patent Application Publication No. Sho 60-3793, a lip information analysis apparatus is proposed which is accomplished by putting four high-brightness markers such as light emitting diodes on lips for facilitating marker position detection, photographing motion of the markers with a video camera, and executing pattern recognition of voltage waveforms provided by a position sensor called a high-speed multipoint X-Y tracker. However, to detect voice in a light room, the technique also requires means for preventing noise of a high-brightness reflected light component produced by spectacles, gold teeth, etc., of a speaker. Thus, it requires preprocessing and feature extraction technique of two-dimensional images input through a television camera, but the technique is not covered in the Unexamined Japanese Patent Application Publication No. Sho 60-3793. Several apparatuses for inputting lips and surroundings thereof directly into a video camera without using markers and performing image processing for feature extraction of vocal organs are also proposed. For example, in the Unexamined Japanese Patent Application Publication No. Hei 6-12483, an image of lips and surroundings thereof is input into a camera and is processed to produce a contour image and a vocalized word is estimated by a back propagation method from the contour image. Proposed in the Unexamined Japanese Patent Application Publication No. Sho 62-239231 is a technique for using a lib opening area and a lip aspect ratio for simplifying lip image information. Designed in the Unexamined Japanese Patent Application Publication No. Hei 3-40177 is a speech recognition apparatus which has the correlation between utterance sound and lip motion as a database for recognizing unspecific speakers. However, the conventional methods handle only position information provided from two-dimensional images of lips and periphery thereof and is insufficient to determine phonemes having delicate lip angle change information and skin contraction information. The conventional two-dimensional images processing methods having large amounts of information to extract markers and features, thus are not appropriate for speeding up.

Several methods without using a video camera are proposed; techniques of extracting utterance information from an electromyogram (EMG) of the surroundings of lips are proposed. For example, in the Unexamined Japanese Patent Application Publication No. Hei 6-12483, an apparatus using binarization information of an EMG waveform is designed as alternative means to image processing. In Kurita et al., "A Physiological Model for the Synthesis of Lip Articulation," (The Journal of the Acoustical Society of Japan, Vol. 50, No. 6 (1994), pp. 465–473), a model for calculating a lip shape from an EMG signal is designed. However, the utterance information extraction based on the EMG involves a problem of a large load on the speaker because electrodes with measurement cords must be put on the surroundings of the lips of the speaker. Several techniques of attaching an artificial palate for obtaining a palatographic signal, thereby detecting a tongue motion accompanying voice producing of a speaker for use as a voice input apparatus are also invented. For example, in the Unexamined Japanese Patent Application Publication No. Sho 55-121499, means for converting the presence or absence of contact between a transmission electrode attached to an artificial palate and a tongue into an electric signal is proposed. In the Unexamined Japanese Patent Application Publication No. Sho 57-160440, the number of electrodes attached to an artificial palate is decreased for making good tongue touch. In the Unexamined Japanese Patent Application Publication No. Hei 4-257900, a palatographic light reception signal is passed through a neural network, whereby unspecific speakers can be covered. In addition to use of a tongue motion, a device of bringing the bush rod tip into a soft palate, thereby observing vibration of the soft palate is proposed in the Unexamined Japanese Patent Application Publication No. Sho 64-62123. However, the device needs to be attached to the inside of a human body, thus there is a possibility that a natural speech action may be disturbed, and the load on the speaker is also large. It is desirable to eliminate the need for contacting the human body as much as possible as a utterance state detection apparatus or device.

A position detection method according to prior technology for putting markers is shown by taking the Unexamined Japanese Patent Application Publication No. Hei 6-43897 as an example (FIG. 10). In the prior technology, images of markers M0, M1, . . . , M9 are input from the front where the feature of lips 905 and the periphery thereof can be best grasped. Thus, position of the markers movement accompanying utterance up and down 101, 102, 104 and from side to side 103, 105 can be detected in two dimensions, but back-and-forth move of the markers M0, M1, . . . , M9 accompanying utterance cannot be captured (Daivid G. Stork, Greg Wolff, Earl Levine, "Neural network lipreading apparatus for improved speech recognition," in Proc. IJCNN, IEEE, Vol. II 1992). To detect front and back-and-forth motion in three dimensions at the same time, in the prior technology, several television cameras need to be provided for stereoscopically measuring the positions of vocal organs of lips, etc. The technologies are introduced as real-time three-dimensional coordinate output technologies on optical measuring instrument exhibitions, etc., from a number of manufacturers. The measurement time sampling rate is 60 Hz and markers are upsized (about 20 mm in diameter) and are made spherical for facilitating marker extraction processing in order to enable high speed; the marker images show the same round shape independently of the shooting position. Further, the markers are colored in striking colors so that they can be easily extracted. However, such large markers cover most of lips and lip periphery and thus are not appropriate for detecting delicate motion of the lips and lip periphery with high accuracy. To improve this defect, if the markers are downsized and are made like thin sheets so as to not disturb utterance, two-dimensional image processing to detect the markers and extract the feature amounts of vocal organs takes time and it becomes difficult to detect positions in real time, as described with the Unexamined Japanese Patent Application Publication No. Hei 6-43897. Three-dimensional measurement, which uses two or more cameras at the same time, has disadvantages of complicated image processing, high equipment costs, and a large size.

The Unexamined Japanese Patent Application Publication No. Hei 7-306692 is disclosed as a technology seemingly similar to a technology proposed in this invention to solve the problems. In the technology proposed in the Unexamined Japanese Patent Application Publication No. Hei 7-306692, lips and periphery thereof are irradiated with a ray of light, diffused reflected light from the skin surface is detected at a light receptor, and strength change of the diffused reflected light is measured, thereby detecting voice information of the speaker. However, diffuse reflection plates such as markers and specular reflection plates of this invention are not put on lips or periphery thereof. The relationship between the reflected light strength and position and motion of the lips is not necessarily clear and a neural network is used for recognition processing. This technology is explained as a technique having low voice detection accuracy and roughly classifying phonemes into categories as auxiliary means of voice recognition technology, as described in the specification. Games with limited situation and expected conversation are shown as one application example in the Unexamined Japanese Patent Application Publication No. Hei 8-187368. In contrast, this invention provides a technology of putting specular reflection plates on skin portions of vocal organs and periphery thereof for specifying measurement points and finding position and angle change of the specific portions accurately as geometrical optics using specular reflection; the invention is entirely different from the Unexamined Japanese Patent Application Publication No. Hei 7-306692.

The problems to be solved by this invention are to lessen the load on the user and improve voice detection percentage as compared with the prior technology and enable voice detection in real time. The conventional voice detection technology using an image is to input a two-dimensional image of a lip periphery through a television camera, etc., and extract the features at the pronunciation time, thereby detecting voice. Specifically, preprocessing, feature extraction, and classification description are executed for an input image of the lip periphery and optimum matching with a standard pattern is executed for detecting voice. The preprocessing technique includes classified into noise removal, density conversion, distortion correction, normalization, etc., and the feature extraction technique is classified into line extraction, area extraction, texture extraction, etc. In the line extraction, differential operation and second-order differential operation of an input image are performed for clarifying the contour of the input image and binarization processing is performed. If the line thus extracted contains a defective point, a curve application technique is used to correct the defective point. For the area extraction, a density histogram, color image color difference, etc., is used. The periodic fine structure feature of an image provided by two-dimensional Fourier transformation is used to extract the texture of the image. As the classification description technique, feature vectors capable of classifying voices are defined for extracted areas and extracted lines and the voice best matching a standard pattern statistically in a feature space formed by the feature vectors is selected. Also, a classification description technique for focusing attention on the feature pattern structure phase and executing syntax pattern recognition is proposed. In recent years, a method of applying a neural network to structure determination and phoneme detection has been proposed. The techniques are extremely intricate as described above; particularly in the preprocessing and feature extraction, the techniques take time in two-dimensional image processing and are improper for voice detection in real time. In giving utterance in a small voice, etc., with small lip opening and closing amounts, move amounts of markers put on lips and periphery thereof are small and positions cannot be detected with good accuracy.

On the other hand, the direct measurement technology of the state and positions of utterance organs is high in target part measurement accuracy, but the load on the user is extremely large; even if the state of a specific articulation organ is measured with high accuracy, voice produced by total motion of articulation organs cannot be detected.

SUMMARY OF THE INVENTION

It is an object of the invention to solve the problems.

To solve the problems, according to the invention, there is provided a voice detection apparatus for extracting a features from either or both of an angle of a skin surface and time characteristic of the angle on a skin of vocal organs and periphery thereof changing with vocalization of a speaker and detecting a voice. Of course, the features may be determined from the skin position in addition to the angle of the skin surface.

In the configuration, the surface angle of the skin of vocal organs and periphery thereof changing in response to the utterance state is used to detect a voice. Thus, if noise, etc., exists, reliable voice detection can be executed. If irradiation with a ray of light and specular reflection of light are used, the skin surface angle can be detected reliably and promptly.

To solve the problems, according to the invention, there is provided a voice detection apparatus comprising a position detection sensor for receiving a specularly reflected light spot moving as a speaker utters a vocal sound, an output coordinate calculation section for calculating a coordinate position of the specularly reflected light spot, a feature extraction section for extracting features from information of the coordinate position or time characteristic of the coordinate position, a standard pattern storage section for previously storing standard patterns of the features obtained from the coordinate positions of the specularly reflected light spots or time characteristic of the coordinate positions, and a comparison section for comparing a signal from the feature extraction section with the standard feature patterns stored in the standard pattern storage section.

In the configuration, the coordinate position of the specularly reflected light spot is detected and the features can be extracted in response to voice reliably and promptly, then the voice can be detected based on the feature.

The feature extraction section may detect a stop point from time characteristic of the coordinate position of the specularly reflected light spot and extract the features from the stop point.

The voice detection apparatus may further include a light source section for generating a ray of visible light, infrared light, or ultraviolet light and applying the ray of light to a skin portion of vocal organs and periphery thereof of the speaker and a specular reflection plate being attached to the skin of vocal organs and periphery thereof of the speaker for specularly reflecting the ray of light, whereby the specularly reflected light spot is formed.

The position detection sensor and the light source section may be integral in one piece and mounted on a head of the speaker.

A plurality of the specular reflection plates may be attached to the skin portion of vocal organs and periphery thereof of the speaker, and the voice detection apparatus may further include discrimination means for discriminating the specularly reflected light spots specularly reflected from the specular reflection plates from each other, wherein the features may be extracted from the relationship between the coordinate positions calculated from the specularly reflected light spots discriminated from each other.

A plurality of position detection sensors may be used to separate and detect a plurality of specularly reflected light spots from the specular reflection plates.

The light source section for applying light to the specular reflection plates may consist of a plurality of light sources and the light sources may share the load of applying light to sets into which the specular reflection plates are grouped.

The position detection sensor for receiving the specularly reflected light spot specularly reflected by the specular reflection plate attached to the median of the skin of vocal organs and periphery thereof of the speaker may be a one-dimensional position detection sensor.

The position detection sensor for receiving the specularly reflected light spot specularly reflected by the specular reflection plate attached to a position deviating from the median of the skin of vocal organs and periphery thereof of the speaker may be a two-dimensional position detection sensor.

The light source section may consist of a plurality of light sources having different spectral characteristics.

The voice detection apparatus may further include a switching circuit for blinking the light sources of the light source section in sequence.

The specular reflection plates may have different spectral reflection characteristics.

The two-dimensional position detection sensor may comprise a pair of a screen and a two-dimensional CCD camera for photographing the specularly reflected light spot projected on the screen and the position of the specularly reflected light spot may be calculated from CCD sensor output.

The position of attaching the specular reflection plate to the skin of vocal organs and periphery thereof of the speaker may be contained in at least one of the regio suprahyoidea, the trigonum submandibulare, the trigonum caroticum, and the regio cervicalis mediana of the speaker.

The positions of attaching the specular reflection plates to the skin of vocal organs and periphery thereof of the speaker may be the lip median inner peripheral upper part and the lip median inner peripheral lower part of the speaker. In this case, a one-dimensional or two-dimensional position detection sensor may be used for voice detection.

The positions of attaching the specular reflection plates to the skin of vocal organs and periphery thereof of the speaker may be the lip median outer peripheral upper part and the lip median outer peripheral lower part of the speaker. Also in this case, a one-dimensional or two-dimensional position detection sensor may be used for voice detection.

BRIEF DESCRIPTION OF THE DRAWINGS

In the accompanying drawings:

FIG. 15 is an illustration to show feature vectors of vowels of speaker 2 in the second embodiment of the invention;

FIG. 18 is an illustration to explain feature vectors of vowels of speaker 1 in the third embodiment of the invention;

FIG. 30 is a graph to show a data example of vowel /a/ shown in the fourth embodiment of the invention; and FIG. 31 is a graph to show a data example of vowel /i/ shown in the fourth embodiment of the invention.

DETAILED DESCRIPTION OF THE PREFERRED EMBODIMENTS

Figure 1:
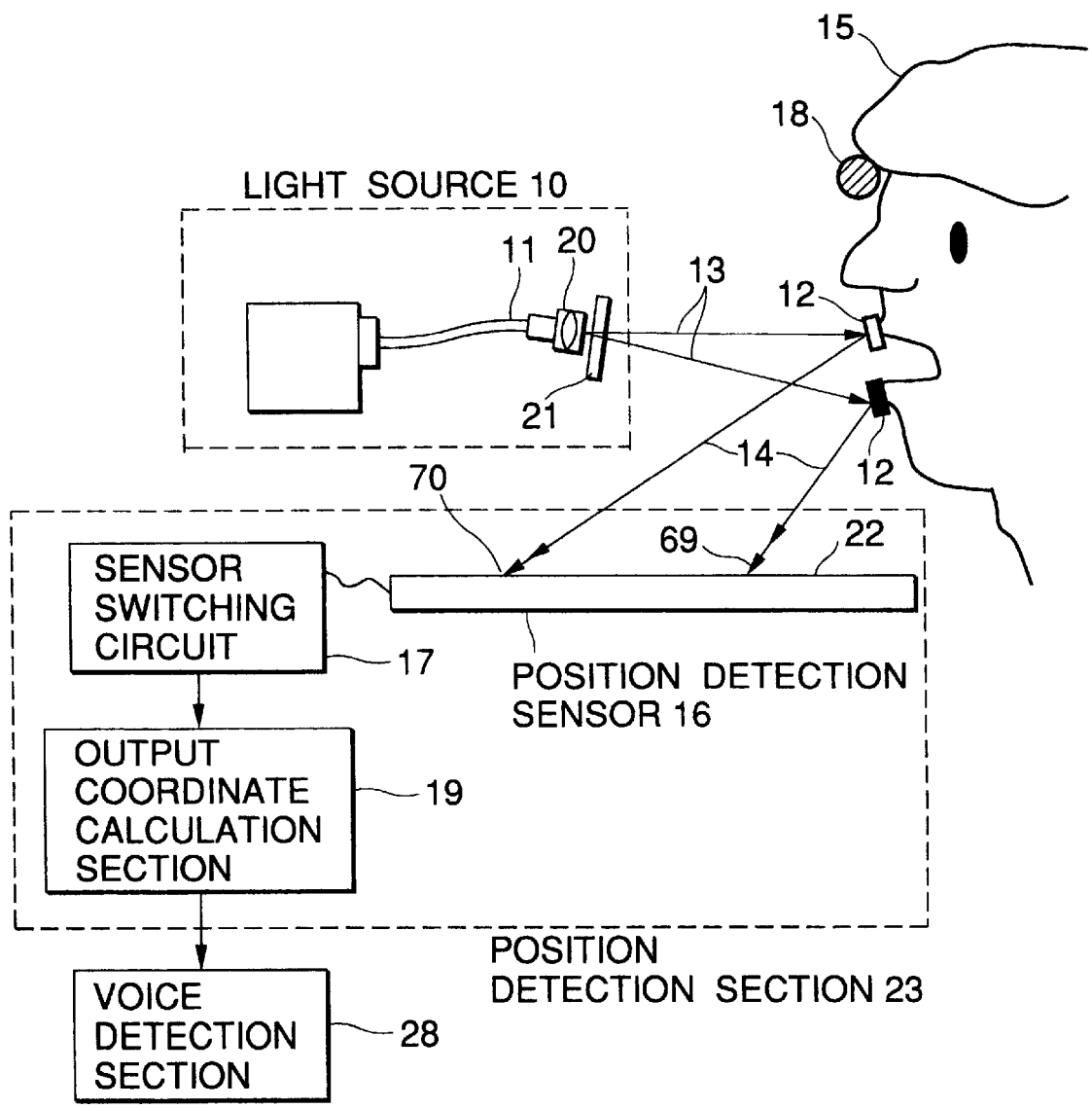
FIG. 1 is a drawing to show a basic configuration of a voice detection apparatus used in first and second embodiments of the invention.

Means adopted to solve the problems will be discussed in detail mainly with reference to FIG. 1. First, to take a load off the user, the invention adopts a non-contact measurement method rather than direct measurement of a living body. To enable detection in real time, when using a two-dimensional image input through means such as a television camera, the invention adopts a method of converting image signal information directly into a coordinate signal by performing simple preprocessing without adopting a method of preprocessing image information intact as two-dimensional information and calculating a position signal after feature amount extraction, whereby the information amount used in the preprocessing is reduced drastically and voice detection in real time is enabled. A simple photoelectric position measurement method is adopted as a method of converting vocal organ displacement information directly into a coordinate signal without using a two-dimensional image of a television camera, etc. For the methods, use of specular reflection plates 12 is extremely effective, as described later.

To further improve voice detection accuracy, unlike the markers adopted in the prior technology, specular reflection plates are adopted in the invention and measurement of minute angle change and position change of living body vocal organs is enabled by a technology based on geometrical optics, thereby improving detection accuracy of a vocal organ shape.

Specifically, the invention is embodied by specular reflection plates attached to vocal organs and periphery thereof of a speaker 15, a light source section 10 for irradiating the specular reflection plates 12 with a ray of light (infrared ray or ultraviolet ray as well as visible light), and a position detection section 23 containing a position detection sensor 16 for receiving specularly reflected light spots 69 and 70 formed by a ray of light reflected by the specular reflection plates 12 and detecting projection positions of the specularly reflected light spots. According to the configuration, as the speaker 15 produces a voice, the positions and angles of the specular reflection plates 12 put on the skin of the vocal organs and periphery thereof change. Resultantly, the ray of light 13 applied from the light source section 10 is reflected by the specular reflection plates 12 uniquely in accordance with a law of reflection and the direction of the ray of light changes. The specularly reflected light spots 69 and 70 moving on the face of the position detection sensor 16 are detected by the position detection sensor 16, thereby detecting the positions of the specularly reflected light spots corresponding to the shape of the vocal organs and periphery thereof produced as the speaker 15 produces the voice. Time characteristic and position change features are extracted from coordinates information of the specularly reflected light spot positions detected. The features are compared with previously stored standard patterns indicating the time characteristic and position change features for each voice signal, thereby classifying input voice. Only the specularly reflected light spots are extracted in the technology. Thus, unlike the prior technology, the image of human body lip periphery, surrounding structure, a background, etc., is not formed on the sensor together with markers; it does not take time in pattern recognition and the coordinate positions of the specularly reflected light spots can be detected.

Figure 12:
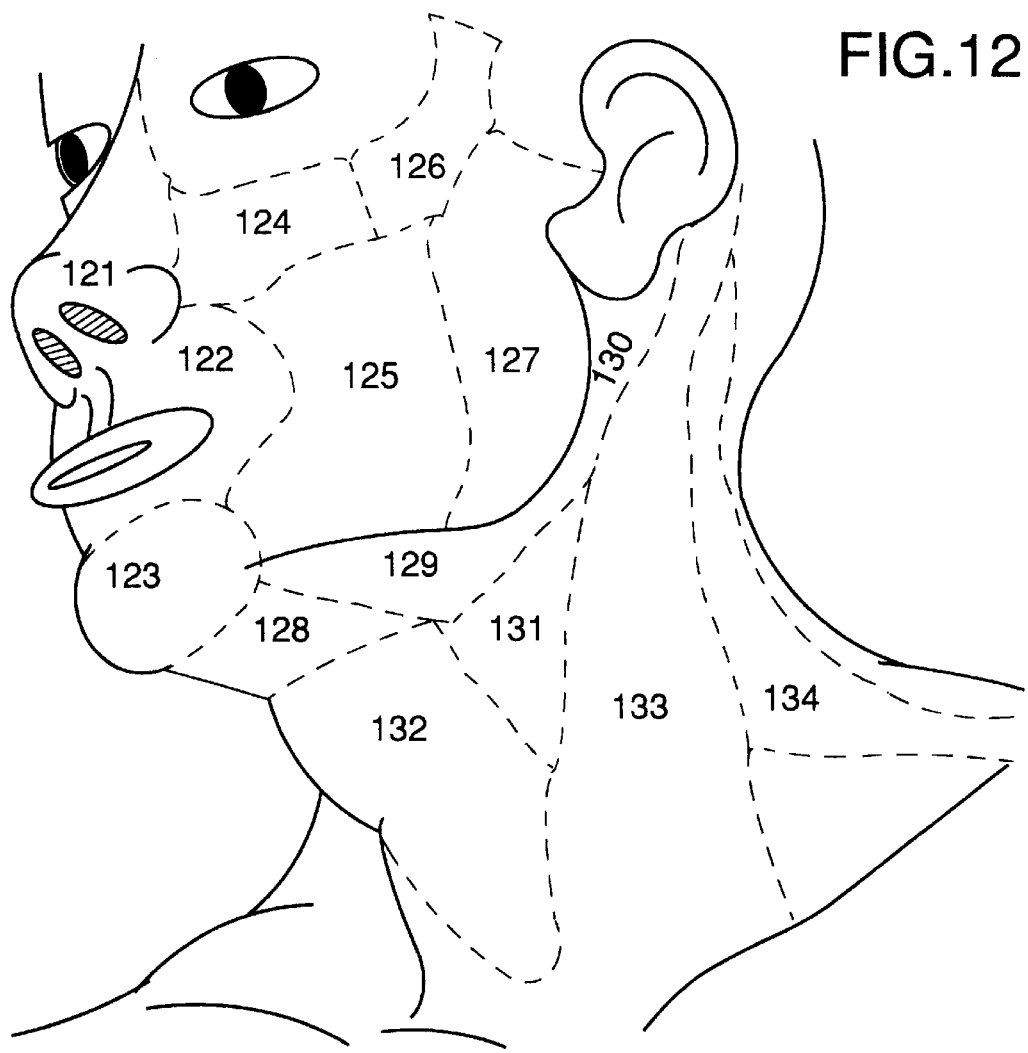
FIG. 12 is an illustration to explain the names of skin portions of voice organs and periphery thereof.

The function of a technique for accurately detecting change of utterance organs in the invention will be discussed. For easy explanation of the positions of putting the specular reflection plates 12 in the description to follow, the names of the skin portions of human body vocal organs and periphery thereof are shown in FIG. 12, which is newly drawn to explain the names of the parts required for the invention with reference to an anatomy document. The portions numbered and surrounded by dashed lines in FIG.

Figure 11:
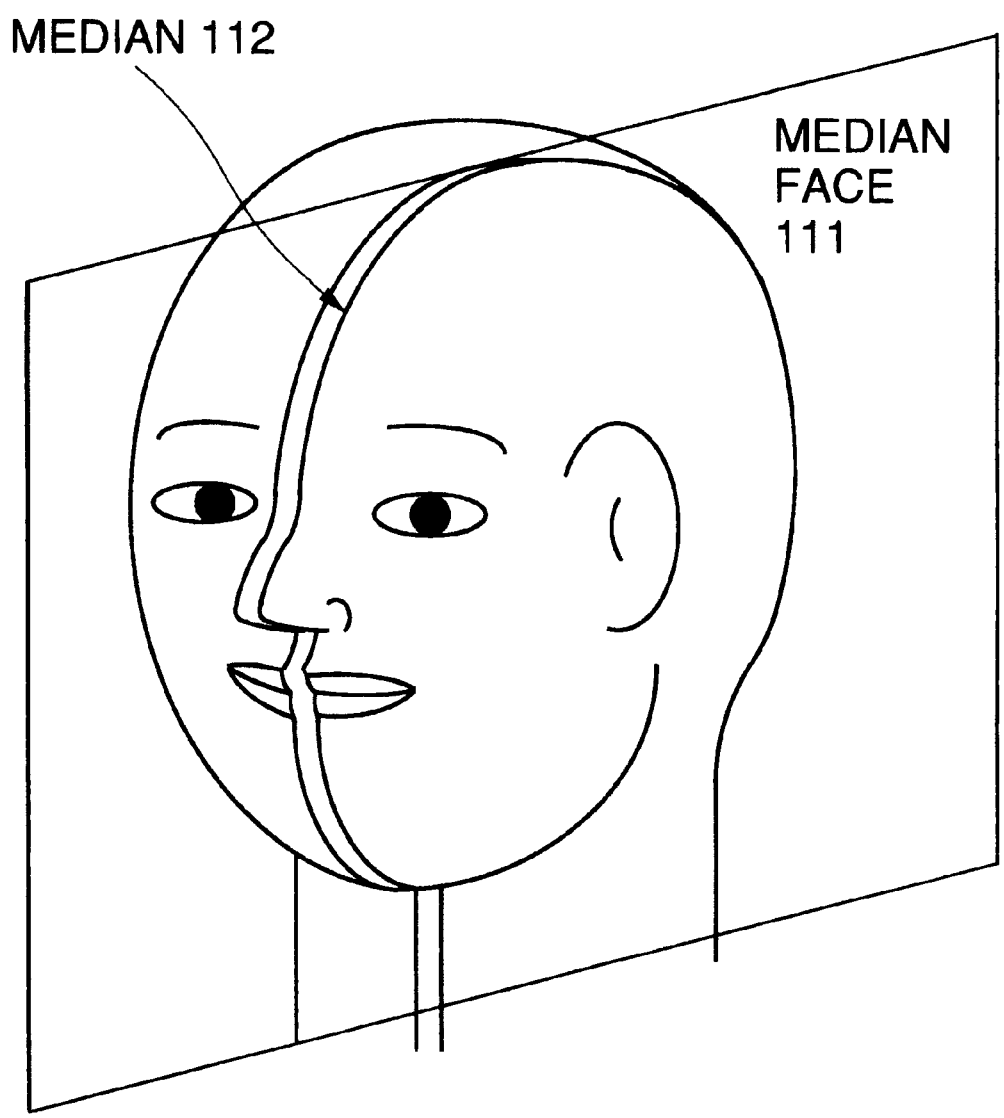
FIG. 11 is an illustration to explain a median plane and a median of a human body head.

12 correspond to medical terms of a face and a neck and are called a regio nasalis 121, a regio oralis 122, a regio mentalis 123, a regio infraorbitalis 124, a regio buccalis 125, a regio zygomatica 126, a regio parotideomasseterica 127, a regio suprahyoidea 128, a trigonum submandibulare 129, a fossa retromandibularis 130, a trigomun caroticum 131, a regio cervicalis mediana 132, a regio sternocleidomastoidea 133, and a regio cervicalis lateralis 134. FIG. 11 shows the relationship between a median plane 111 and a median 112 of the center of the left and right of a human body. A method of catching delicate spatial change of a living body surface produced by vocal organ motion at the utterance time for voice detection will be discussed. For example, the specular reflection plates 12 are placed at attachment positions a1 (51), a2 (52), b1 (53), b2 (54), c1 (55), c2 (56), d (57), and e (58) shown in FIG. 5. The specular reflection plates 12 are bonded to the skin surface of by the regio oralis 122 of a speaker by pasting means such as adhesive tape. The placed specular reflection plates 12 are delicately rotated accompanying skin motion as the speaker speaks.

Figure 6:
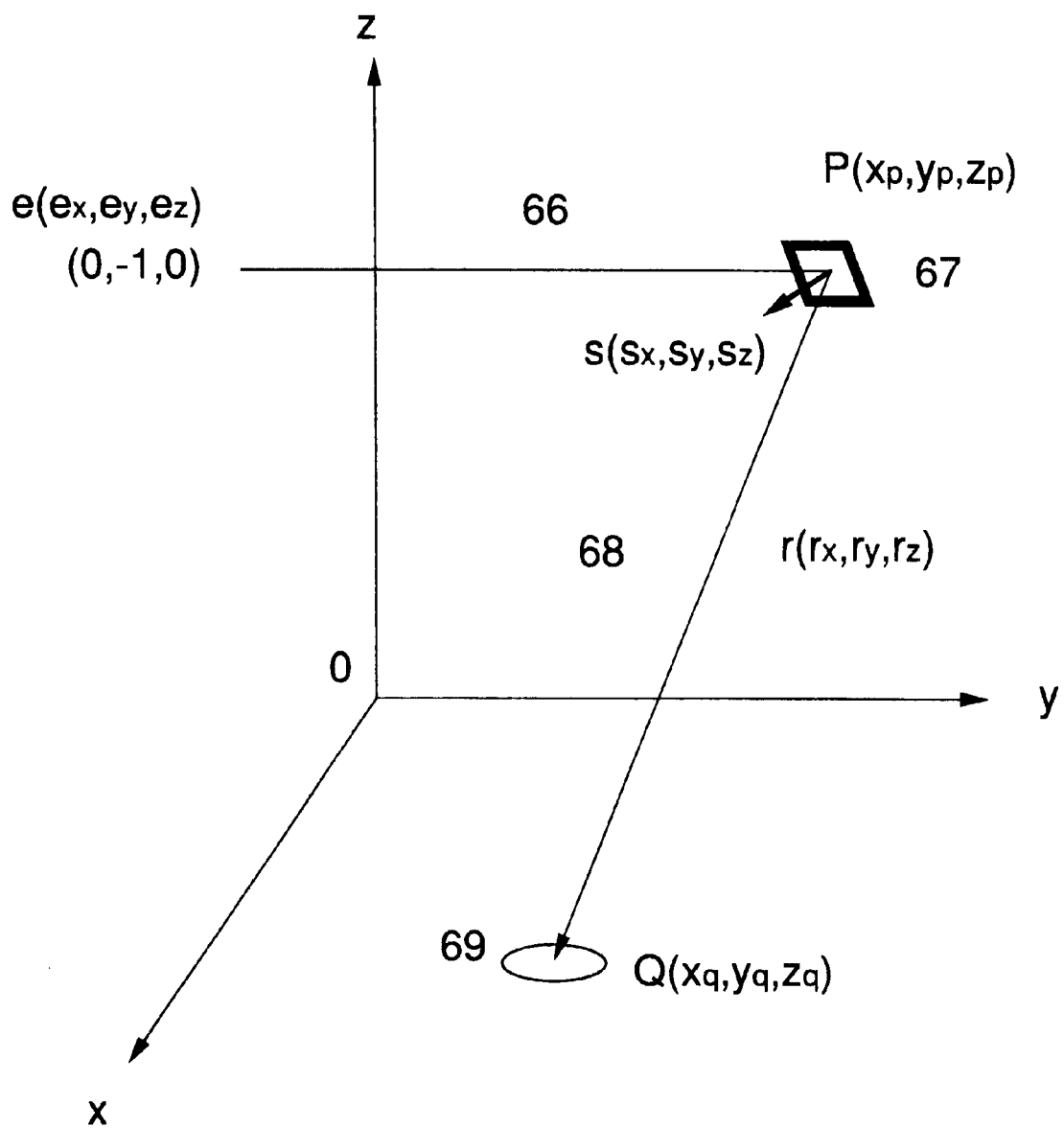
FIG. 6 is an illustration to explain the relationship between the position and angle of a specular reflection plate and a specularly reflected light spot projection point.

To detect the motion, attention is focused on one of the attachment positions of the specular reflection plates 12 placed on the speaker skin, a1 (51), a2 (52), b1 (53), b2 (54), c1 (55), c2 (56), d (57), and e (58), and the specular reflection plate is assigned 67 as shown in FIG. 6 (the speaker is not shown). The specular reflection plate 67 is irradiated with a ray of light 66 with directivity. The direction of the ray of light 66 is represented by unit vector e*=(ex, ey, ez) (* denotes a vector). The ray of light 66 may be a parallel rays provided by optical means such as a collimator lens (not shown), a divergent rays of a point light source, etc., (not shown) with a light emission point position determined, or a convergent rays converging on a determined point by a lens, a spherical mirror, etc., (not shown).

The position coordinates of the specular reflection plate 67 are set to P (xp, yp, zp). The normal direction of the specular reflection plate 67 is represented by unit vector s*=(sx, sy, sz). The ray of light 66 incident on the specular reflection plate 67 is specularly reflected by the specular reflection plate 67 and a specularly reflected light spot 69 arrives at point Q on x-y plane, a light reception position. If the direction of reflected light 68 is represented by unit vector r*=(rx, ry, rz), the components of the unit vector are as follows:

[Mathematical 1]

$$rx = ex - 2sx(e^* \cdot s^*) \quad (1)$$

$$ry = ey - 2sy(e^* \cdot s^*) \quad (2)$$

$$rz = ez - 2sz(e^* \cdot s^*) \quad (3)$$

The equation of the reflected light 68 is given by the following expression:

[Mathematical 2]

$$(x-xp)/rx = (y-yp)/ry = (z-zp)/rz \quad (4)$$

The coordinates (x, y, z) of the point Q of the intersection of the equation and the light reception face (x-y plane) become as the following expressions:

[Mathematical 3]

$$x = (rx/rz) \cdot (z-zp) + xp \quad (5)$$

$$y = (ry/rz) \cdot (z-zp) + yp \quad (6)$$

From expressions (1) (2), (3), (5), and (6), x and y become as the following expressions:

[Mathematical 4]

$$x = ((ex - 2sx(e^* \cdot s^*))/(ez - 2sz(e^* \cdot s^*)) \cdot (z-zp) + xp \quad (7)$$

$$y = ((ey - 2sy(e^* \cdot s^*))/(ez - 2sz(e^* \cdot s^*)) \cdot (z-zp) + yp \quad (8)$$

It is understood that x and y are functions of point P and vector s*. In other words, index containing information of the point P of the position of the specular reflection plate 67 and direction cosine s* of the specular reflection plate 67 becomes the coordinates of the point Q. Information containing vocal organ position and angle is quantified by measuring the point Q. Even in utterance with small position change component (xp, yp) of the specular reflection plate 67, if the (z-zp) component exists, the position of the specularly reflected light spot 69 largely changes with delicate angle change of lips. That is, lip change is amplified and caught, so that voice detection accuracy can be enhanced dramatically. This is the first function of the invention.

Figure 7:
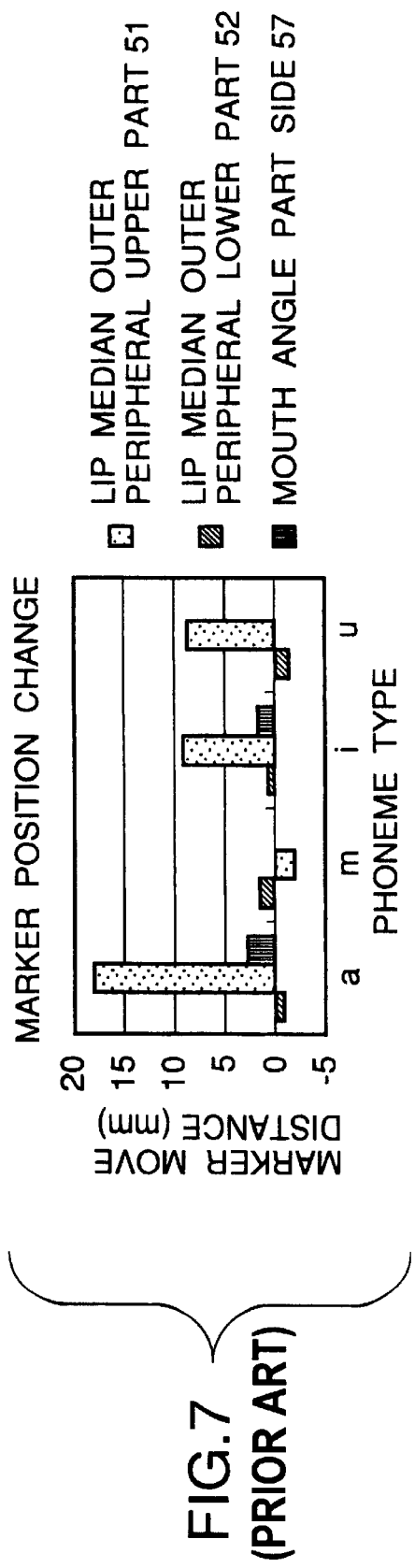
FIG. 7 is a graph to show marker movement distances in prior technology.
Figure 8:
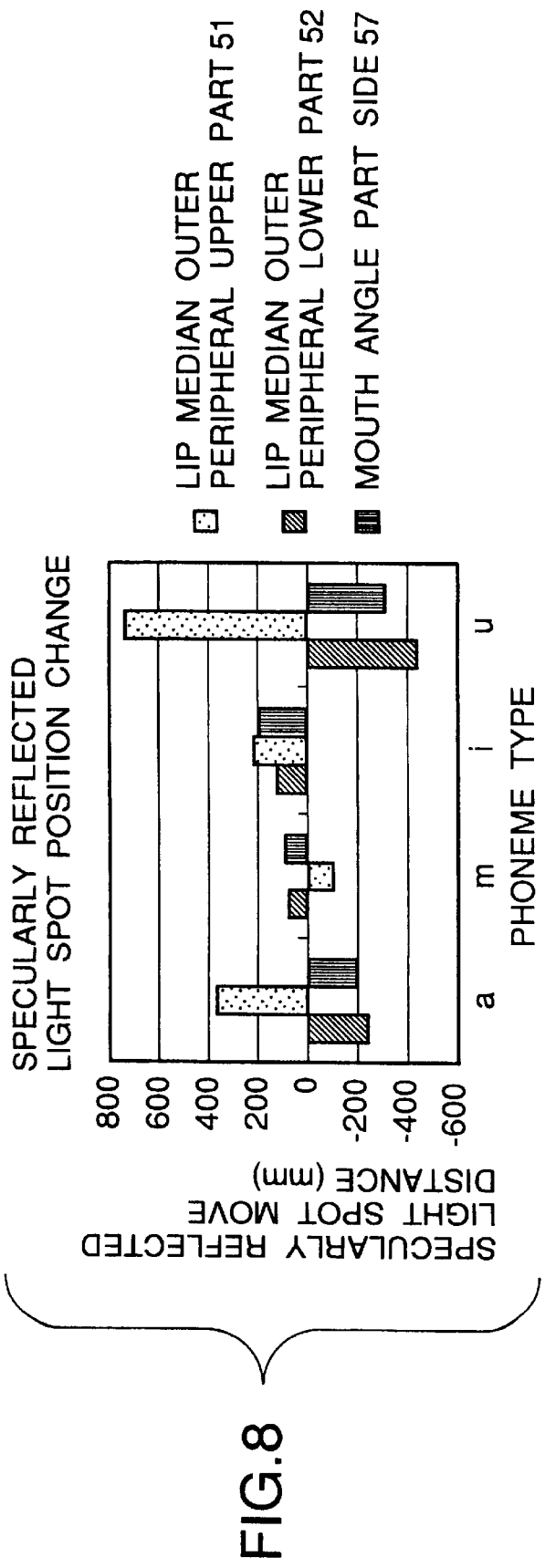
FIG. 8 is a graph to show specularly reflected light spot movement distances constituting grounds for high detection accuracy of the invention.
Figure 9:
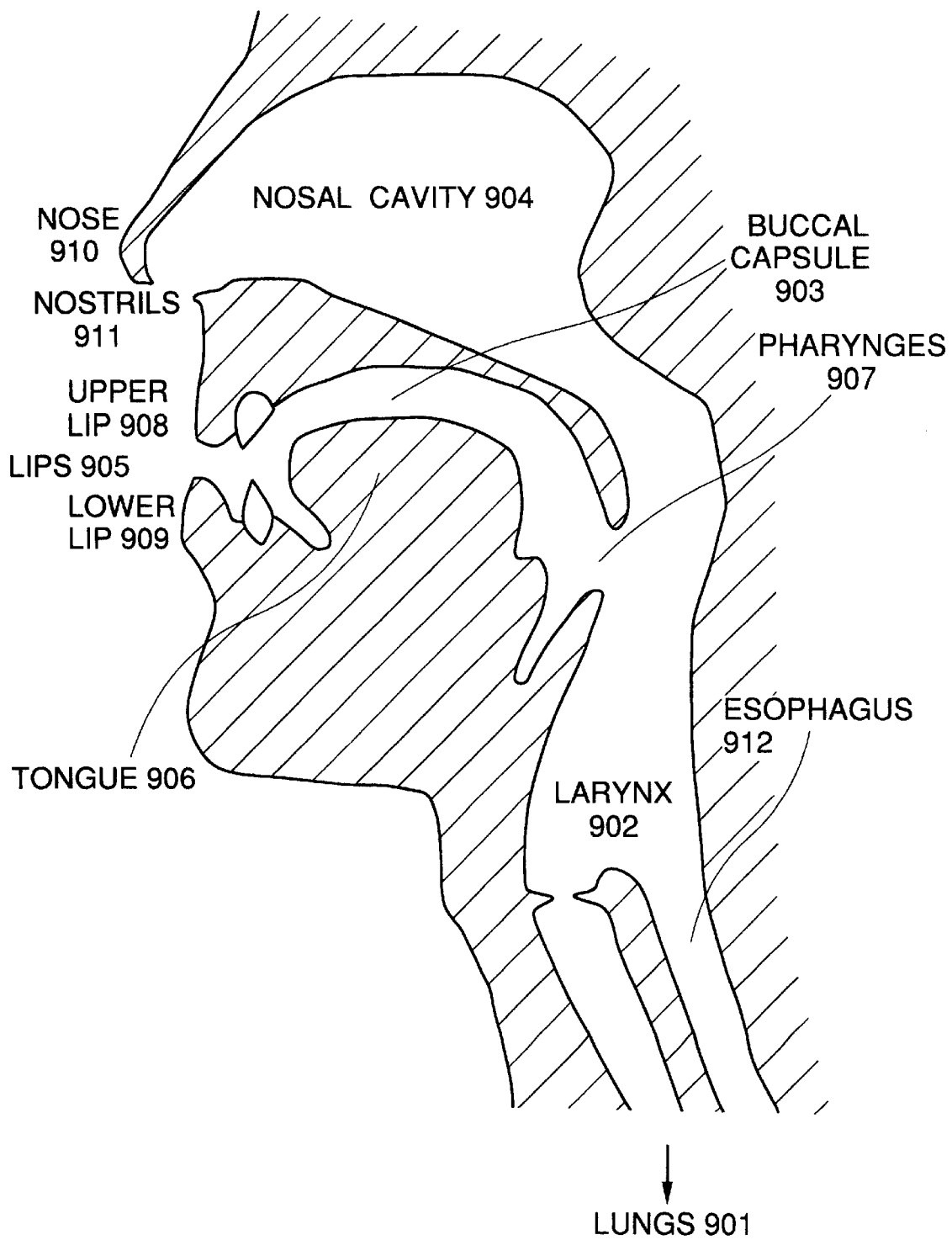
FIG. 9 is an illustration to explain voice organs.
Figure 10:
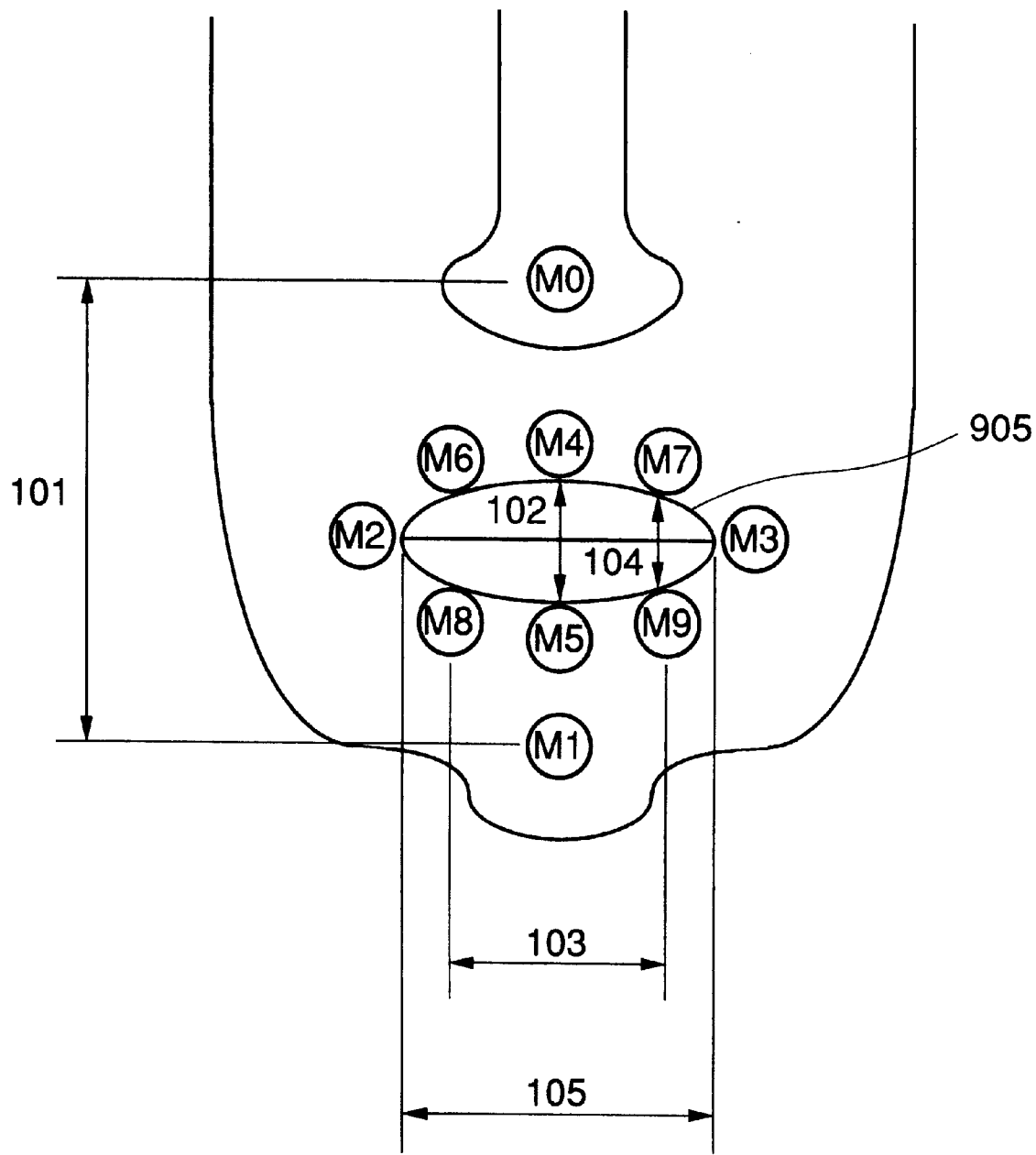
FIG. 10 is an illustration to explain marker putting positions and extracted features in prior technology.

To show the effect, FIGS. 7 and 8 show the measurement results of the movement distances of the specularly reflected light spots at the utterance time when the specular reflection plates are put on the regio oralis and the movement distances of the marker positions when markers are put at the same time. The movement distance in the figures indicates the maximum longitudinal movement distance between the position of the specularly reflected light spot or the marker when lips are closed before utterance and the move position of the specularly reflected light spot or the marker at the utterance time. The placement positions of the specular reflection plates and the markers are the lip median outer peripheral upper part a1 (51), the lip median outer peripheral lower part a2 (52), and the mouth angle part side d (57) shown in FIG. 5. Vocalized phonemes are /a/, /m/, /i/, and /u/, which are slowly and separately pronounced. To find the movement distance of the marker position, a lip image photographed together with a scale is reproduced on a videocassette recorder and the movement distance on the television screen is converted into an actual dimension. The specularly reflected light spot movement distance is found from the dimension on the position detection sensor 16 in the apparatus in FIG. 1. If the specularly reflected light spot movement distance exceeds the length of the position detection sensor 16, a scale is used to measure the movement distance by a visual inspection. Making a comparison between FIG. 7 showing the movement distances of the marker positions put on the lips and FIG. 8 showing change of the specularly reflected light spot positions produced by the specular reflection plates, most of change of the marker positions is caused by position move of the lip median outer peripheral lower part a2 (52) and marker position change caused by the lip median outer peripheral upper part a1 (51) or the mouth angle part side d (57) is small (about 3 mm at most). In contrast, in change of the specularly reflected light spot positions in FIG. 8, not only the movement distance at the lip median outer peripheral lower part a2 (52), but also the movement distances at the lip median outer peripheral upper part a1 (51) and the mouth angle part side d (57) are large, reaching about at least 100 mm. This means an excellent technology capable of evenly detecting motion of the points independently of the points of putting the specular reflection plates as seen in the movement distances of the corner of the mouth side for /m/ and /u/ and extracting the features of voice. The invention enables detection of delicate motion of vocal organs previously impossible.

The second function of the invention is to extract the features of voice produced by a speaker from delicate position and angle displacement of the skin of vocal organs and periphery thereof detected with good accuracy as described above, compare the features with the features of a standard voice patterns previously stored for detecting the voice produced by the speaker, and output the detected voice as a coded signal. The voices detected are at phoneme or mora level and several tens to about a hundred types exist. Therefore, the number of standard voice types is also several tens to about a hundred. (The mora is a pronunciation unit and in Japanese, there are over a hundred types, a, i, u, e, o, ka, ki, ku, ke, ko, . . . , η plus voiced consonants g, z, d, b, p-sound, j-sound in the kana syllable, and contracted sound, most of which are one consonant and one vowel pairs.)

The term "stop point" in the invention is used to mean coordinates where a specularly reflected light spot is a given speed or less. The given speed refers to a speed lower than the normal speed of the specularly reflected light spot or speed zero (stop).

The invention will be discussed in more detail with embodiments.

(First Embodiment)

Accurate quantification of motion of the skin of vocal organs and periphery thereof at the utterance time is indispensable for voice detection. To realize it, the invention adopts specular reflection plates 12, a light source section 10, a position detection section 23, and a voice detection section 28 as a basic configuration. (See FIGS. 1 and 2.) The members will be discussed in order.

Figure 5:
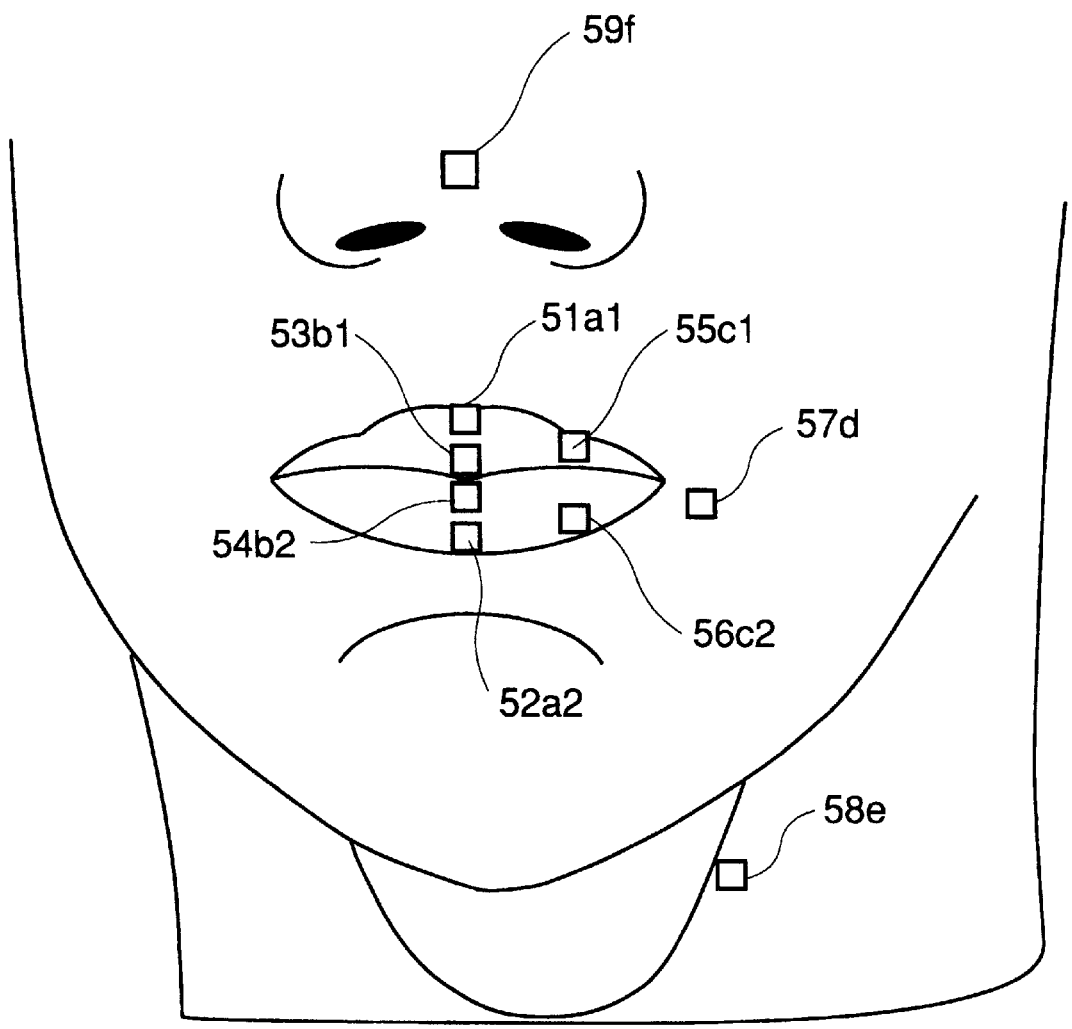
FIG. 5 is an illustration to explain placement positions of specular reflection plates put on skin of voice organs and periphery thereof of a speaker.

The skin portions of vocal organs and periphery thereof to be detected in the invention are a face and a neck of a human body touching the open air in a normal living environment for the purpose of non-contact measurement. The measurement parts adopted in first to fourth embodiments are lip median outer peripheral upper part a1 (51), lip median outer peripheral lower part a2 (52), lip median inner peripheral upper part b1 (53), lip median inner peripheral lower part b2 (54), and mouth angle part side d (57) of regio oralis 122 and point e (58) in the vicinity of the intersection of regio suprahyoidea 128, trigonum submandibulare 129, trigomun caroticum 131, and regio cervicalis mediana 132, as shown in FIGS. 5 and 12. The specular reflection plates 12 are put on the points with double-sided adhesive tape. Each specular reflection plate 12 is manufactured by putting mylar coated with silver on a plastic sheet. The specular reflection plate 12 is provided for specularly reflecting a ray of light and in experiment, specular reflection plates 1–5 mm square with a high reflection factor on a mirror face are adopted to prevent attenuation of a ray of light. The reflection factor is 83% as a result of measurement. However, considering that the specular reflection plates are put on a human body for use in a normal workplace environment, it is desirable to manufacture the specular reflection plates 12 with inconspicuous, transparent material. Even a transparent member having a smooth reflection surface like a mirror face specularly reflects a ray of light. If the transparent member has a refractive index of 1.4 according to Fresnel formulae, the reflection factor becomes about 2.8% at the normal incidence angle. Specularly reflected light can be detected even with such a level of reflection factor. In contrast to making the specular reflection plates 12 inconspicuous, the specular reflection plates 12 can also be fashionably colored and designed as accessaries. In addition to the square, any shape such as a rectangle, a trapezoid, a circle, an ellipse, a triangle, a hexagon, or a star may be adopted if it has a plane capable of specularly reflecting an incident ray of light. The specular reflection plate 12 used in the invention refers to a reflection plate having a smooth plane capable of specularly reflecting a ray of light; any shape can be adopted if it can detect specularly reflected light and the reflection factor may be low as described above. On the other hand, the markers (M0–M9) used in the prior technology are photographed and position information of the markers is detected by performing image processing, thus the diffuse reflection component of the marker material surface is used. For this reason, the diffuse reflection component is taken large and density and color with a large contrast with lip and skin colors are given to the markers. Mirror face reflection plates with a large specular reflection component used in the technology of the invention or transparent plates with a small contrast with lip and skin colors cannot be used for the markers in the prior technology. The fashionable specular reflection plate has a comparatively large diffuse reflection component, but is colorful with fine and complicated design such as a flower or geometric pattern, thus it is extremely difficult to detect the position of the specular reflection plate by image processing; the fashionable specular reflection plate is also improper for the markers (M0–M9) used in the prior technology.

Figure 2:
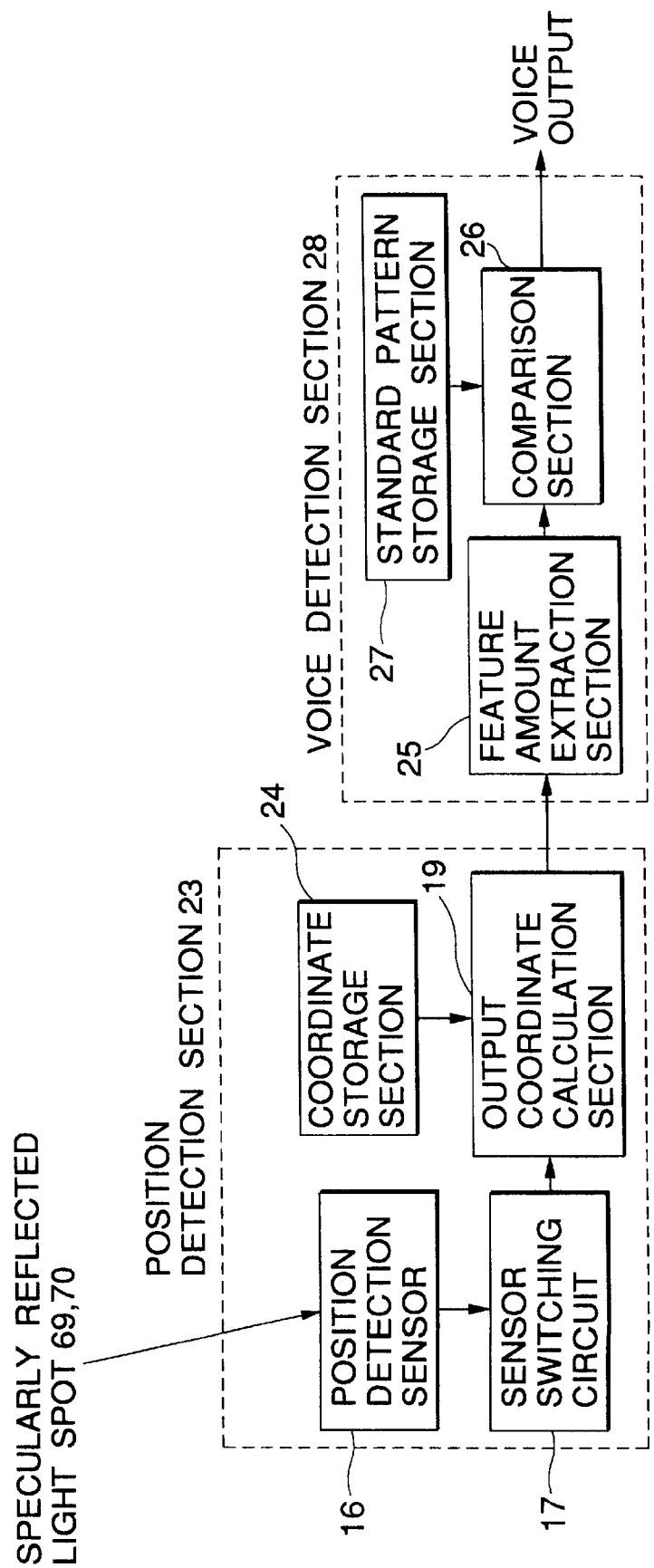
FIG. 2 is a block diagram to show the voice detection apparatus in FIG. 1 in detail.
Figure 3:
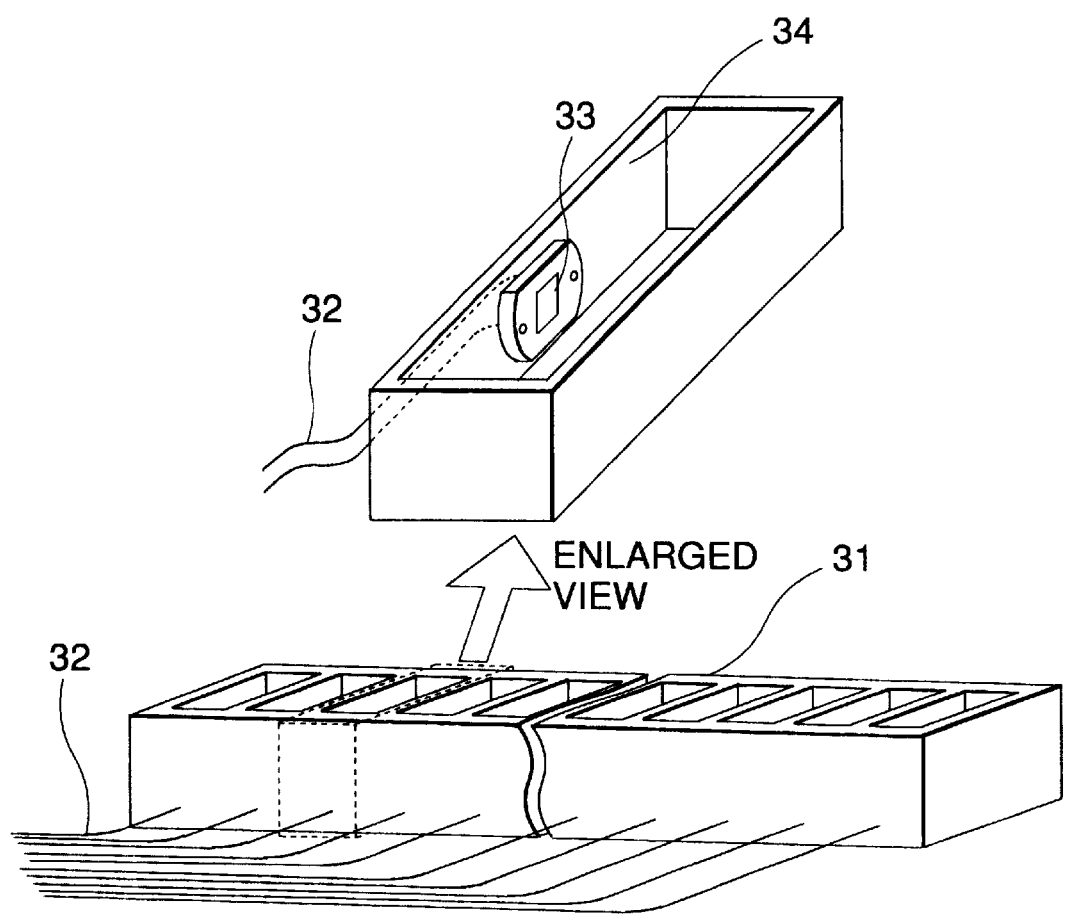
FIG. 3 is a perspective view to show a composition example of a position detection sensor used in first and second embodiments.
Figure 4:
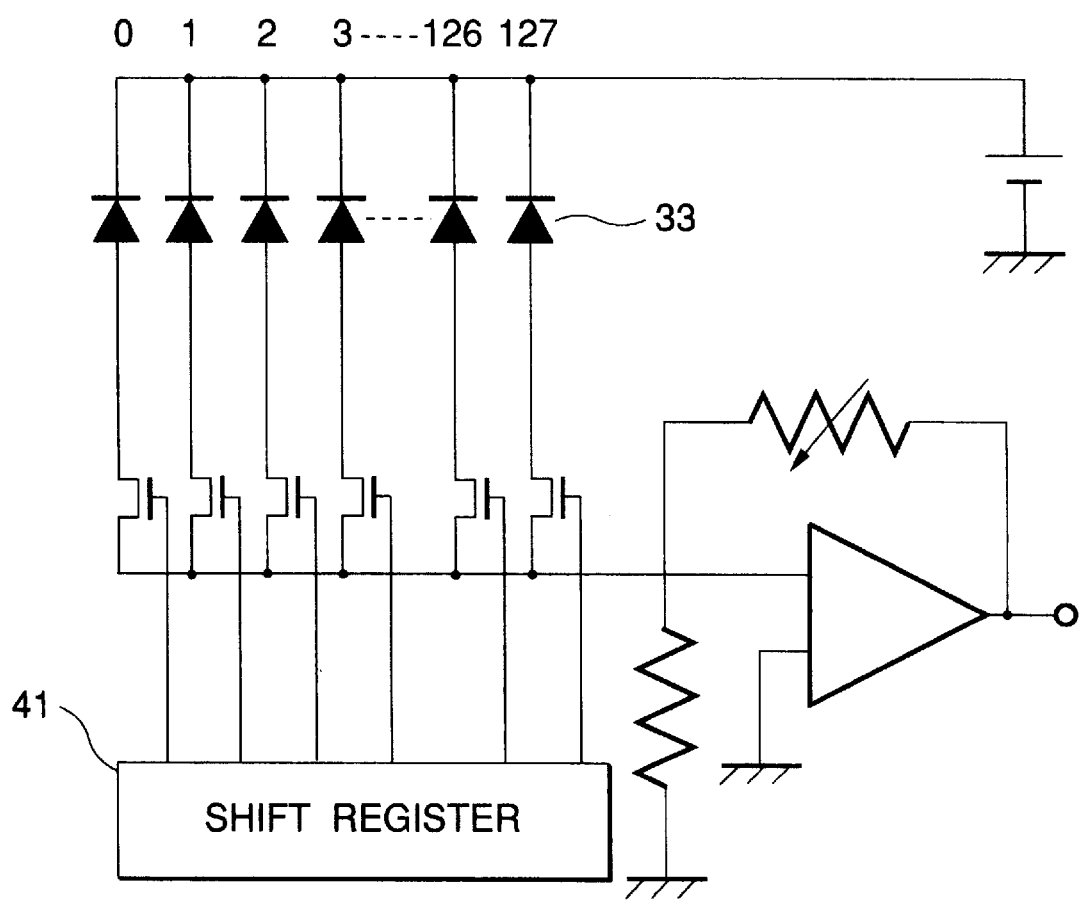
FIG. 4 is a circuit diagram to show a sensor switching circuit example of a position detection section of the invention.

To detect displacement of vocal organs of a speaker 15 with the specular reflection plates 12 put on the lip median inner peripheral upper part b1 (53) and the lip median inner peripheral lower part b2 (54), the light source section 10 for irradiating the specular reflection plates with a ray of light 13 and a position detection sensor 16 for receiving specularly reflected light spots 69 and 70 and detecting light reception positions are configured as shown in FIG. 1. The light source section 10 as lighting means uses an optical fiber lighting device for entering light from a 12 V, 50 W ref-type halogen lamp through one end of an optical fiber light guide 11, passing the light through the optical fiber light guide 11, and emitting the light from the other end of the optical fiber light guide 11. The ray of light 13 emitted from the optical fiber light guide 11 can be adjusted in convergence degree by means of a convex lens 20. Since a face of a human being is irradiated with a ray of light from the halogen lamp containing a large infrared component, an infrared absorption filter 21 (HA-30 manufactured by HOYA CO., LTD.) is inserted into the front of the lens 20 to prevent trouble in eyes from occurring as the retinas are irradiated with infrared rays for a long time. The light source section 10 made of the optical fiber lighting device is fixed to the front of the speaker 15 and the ray of light 13 is applied toward the specular reflection plates 12 put on the lip median inner peripheral upper part b1 (53) and the lip median inner peripheral lower part b2 (54). The specular reflection plates 12 specularly reflect the ray of light 13 and project specularly reflected light spots 69 and 70 on a light reception face 22 of the position detection sensor 16 placed below the front of the speaker 15. Since the specularly reflected light spots 69 and 70 are formed by specular reflection from the specular reflection plates 12 put on the lip median parts, the projection light does not largely swing right and left from the center line of the human body front and the light locus is projected substantially on the line where a median plane 111 of the human body crosses the light reception face 22 of the position detection sensor 16. Thus, a one-dimensional light reception sensor can be used as the position detection sensor 16. Since the light reception range is long (512 mm) in the embodiment, a number of light receiving diodes 33 are arranged linearly ahead the median plane of the speaker 15, thereby forming the position detection sensor 16. A one-dimensional CCD sensor, a position detection sensor (PDS) for detecting light reception position coordinates from the difference of potentials occurring on left and right electrodes depending on the light reception position, or any other light reception device can be used as the sensor if it can identify the light reception position of a ray of light in a one-dimensional direction. The position detection sensor 16 used in the first embodiment is installed in a case consisting of small rectangular cells 34 at 4-mm pitches (4×50 mm) each for fixing a light receiving diode 33 (see FIG. 3). The position detection sensor 16 comprises a total of 128 light receiving diodes 33 placed on an elongated rectangle (512× 50 mm). The shape need not necessarily be a rectangle as shown in FIG. 3 and may be a curved surface if it can be arranged on the median plane 111 of a human body. The reason why each small cell 34 in which one light receiving diode 33 is housed is 50 mm wide is that if the specularly reflected light spot positions produced by the specularly reflected light 14 a little deviate from the line where the median plane of a human body crosses the position detection sensor plane, the specularly reflected light spots 69 and 70 can be detected. In experiment, the degree to which the specularly reflected light spot 69, 70 deviates from the median plane 111 as a speaker head is lightly pressed against a head fixing rod 18 is about ±5–15 mm. The inner faces of the rectangular cells 34 are painted in diffusive white paint and light incident on the inside is diffused and detected on the corresponding one of the 128 light receiving diodes. The position detection sensor 16 determines the position of the specularly reflected light spot 69, 70 in response to the potential of any light receiving diode 33 detecting incident light and timing information from a shift register 41 of a sensor switching circuit 17 shown in FIG. 4. To determine the coordinates position more reliably, output of the sensor switching circuit 17 is input to an output coordinates calculation section 19. The output coordinate calculation section 19 outputs the coordinates of the position of the light receiving diode 33 indicating the maximum output as the light reception position coordinates or calculates center of gravity from an output voltage distribution and outputs the coordinates of the position of the light receiving diode 33 corresponding to the center of gravity as the light reception position coordinates. The switching frequency of the shift register 41 is 40 KHz. A position signal of the specularly reflected light spot is input and the light reception part position of the specularly reflected light spot 69, 70 can be detected at 312.5-Hz intervals (3.2-msec detection cycles). The position detection section 23 made up of the position detection sensor 16, the sensor switching circuit 17, and the output coordinate calculation section 19 can catch motion of the specularly reflected light spots of the specular reflection plates b1 (53) and b2 (54) put on the lip median inner peripheral upper and lower parts in real time. The time for which voice is output at the utterance time varies greatly depending on the phoneme type, the speaker, and the speaker condition. According to measurement executed by Murakami et al., the time ranges from about 10 to 100 msec and a vowel sound is long and a consonant sound is short ("A Discussion of Acoustic Problems in Spontaneous Speech Recognition" The Transactions of the Institute of Electronics Information and Communication Engineers, Vol. J78-D-II, No. 12, pp.1741–1749, December, 1995). The videotape recording interval is 16.6 or 33.3 msec at the normal video rate 1/30 or 1/60 sec and the possibility that an image cannot be captured within the phoneme utterance time is high. However, the position detection section 23 of the invention enables vocal organ shape detection within the voice output time, whereby the relationship between the position of the specularly reflected light spot 70 from the lip median inner peripheral upper part b1 (53) and the position of the specularly reflected light spot 69 from the lip median inner peripheral lower part b2 (54) can be found.

Next, four means each for detecting the specularly reflected light spots 69 and 70 from the two specular reflection plates put on the positions of b1 (53) and b2 (54) at the same time in real time will be discussed.

Figure 20:
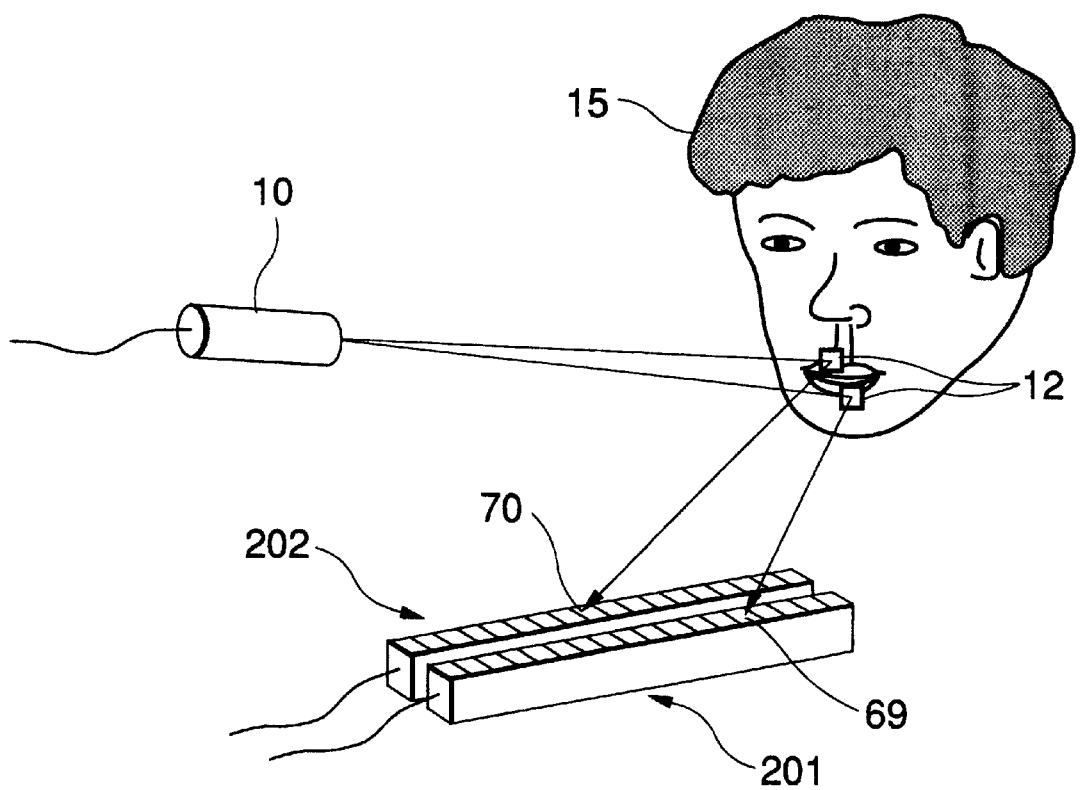
FIG. 20 is an illustration to show the composition of first means for detecting specularly reflected light spots from a plurality of specular reflection plates at the same time, shown in the first embodiment.
Figure 21:
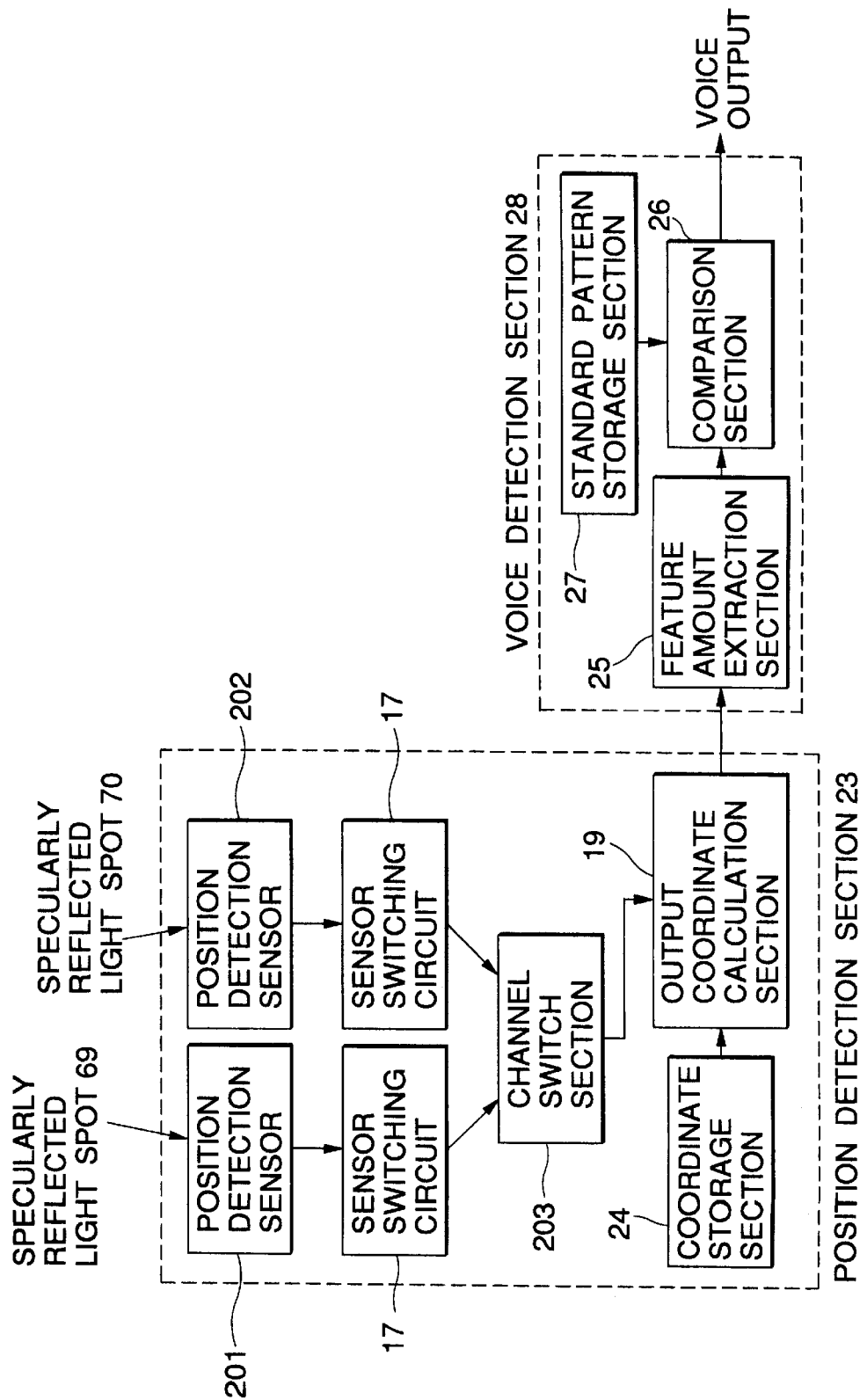
FIG. 21 is a block diagram to show a configuration example of the first means for detecting specularly reflected light spots from a plurality of specular reflection plates at the same time, shown in the first embodiment.

The first means places two position detection sensors 201 and 202 at positions where specularly reflected light spots 69 and 70 can be measured separately (see FIG. 20). Two specular reflection plates 12 are placed on the upper and lower lips at positions a little shifted to the right and left from a median 112, whereby the specularly reflected light spots 69 and 70 are projected on the position detection sensors 201 and 202 separately. FIG. 21 is a block diagram of a position detection section 23 for the first means. Position information of the specularly reflected light spot 69 output from the position detection sensor 201 is contained in timing information from a shift register 41 of a sensor switching circuit 17. Likewise, position information of the specularly reflected light spot 70 output from the position detection sensor 202 is also contained in timing information from a shift register 41 of another sensor switching circuit 17. The two position information pieces are sent to an output coordinate calculation section 19 alternately through a channel switch section 203. The position information of the specularly reflected light spots 69 and 70 projected on the position detection sensors 201 and 202 is determined by the output coordinate calculation section 19 and output to a feature amount extraction section 25 of a voice detection section 28. In the technology, the signals of the position detection sensors 201 and 202 may be output directly to two output coordinate calculation sections 19 (not shown) in parallel for processing not via the channel switch section 203. Although the first means uses two position detection sensors and two specular reflection plates, more than two position detection sensors and more than two specular reflection plates can also be used to detect a greater number of positions, this configuration being contained in the technology.

Figure 22:
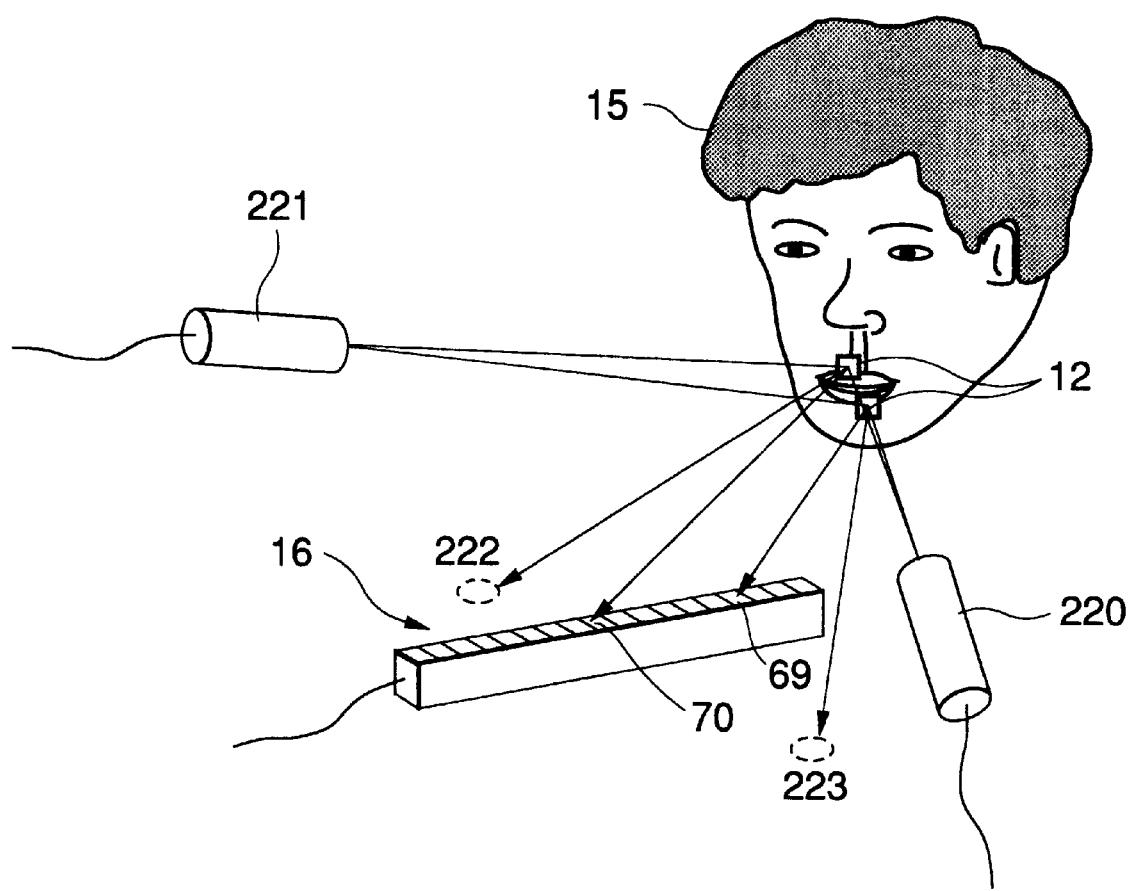
FIG. 22 is an illustration to show the composition of second means for detecting specularly reflected light spots from a plurality of specular reflection plates at the same time, shown in the first embodiment.
Figure 23:
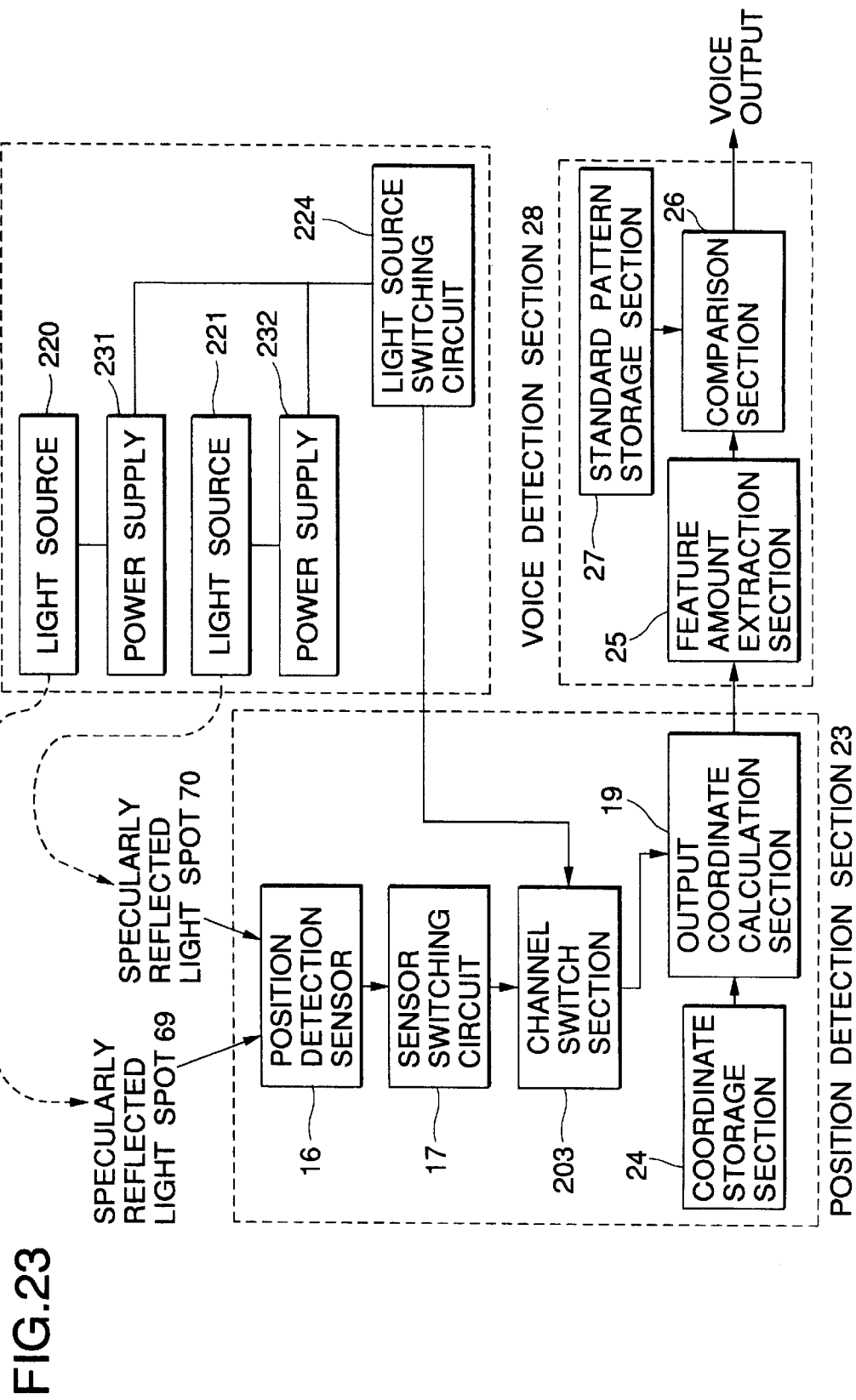
FIG. 23 is a block diagram to show a configuration example of the second means for detecting specularly reflected light spots from a plurality of specular reflection plates at the same time, shown in the first embodiment.

The second means uses only one position detection sensor 16 and provides a light source section 10 with two light sources 220 and 221. Two specular reflection plates 12 are placed on the upper and lower lips. The light sources 220 and 221 for irradiating the specular reflection plates 12 with light are placed as shown in FIG. 22. The light source 220 and the specular reflection plate 12 placed on the lower lip corresponding to the light source 220 are placed so that when the light source 220 is turned on, a specularly reflected light spot 69 of the specular reflection plate 12 placed on the lower lip corresponding to the light source 220 is incident on the position detection sensor 16 and that a specularly reflected light spot 222 of the specular reflection plate 12 placed on the upper lip is projected at a position not incident on the position detection sensor 16. The light source 221 and the specular reflection plate 12 placed on the upper lip corresponding to the light source 220 are placed so that when the light source 221 is turned on, a specularly reflected light spot 70 of the specular reflection plate 12 placed on the upper lip corresponding to the light source 221 is incident on the position detection sensor 16 and that a specularly reflected light spot 223 of the specular reflection plate 12 placed on the lower lip is projected at a position not incident on the position detection sensor 16. The specular reflection plates 12 are placed at positions a little shifted to the right and left from a median 112, whereby the positions of the specularly reflected light spots 69 and 70 irradiated with light from the different light sources 220 and 221 are projected on the plane of one position detection sensor 16. To detect the specularly reflected light spots 69 and 70 separately, the light sources 220 and 221 are switched by a light source switching circuit 224 so that they blink alternately. A synchronizing signal is sent from the light source switching circuit 224 to a channel switch section 203 so as to synchronize with blinking of the light sources, thereby determining which of the specularly reflected light spots 69 and 70 the position signal corresponds to. (See FIG. 23.) Although the second means uses two pairs of light sources and specular reflection plates, more than two pairs of light sources and specular reflection plates can also be used to detect a greater number of point positions, this configuration being contained in the technology.

Figure 24:
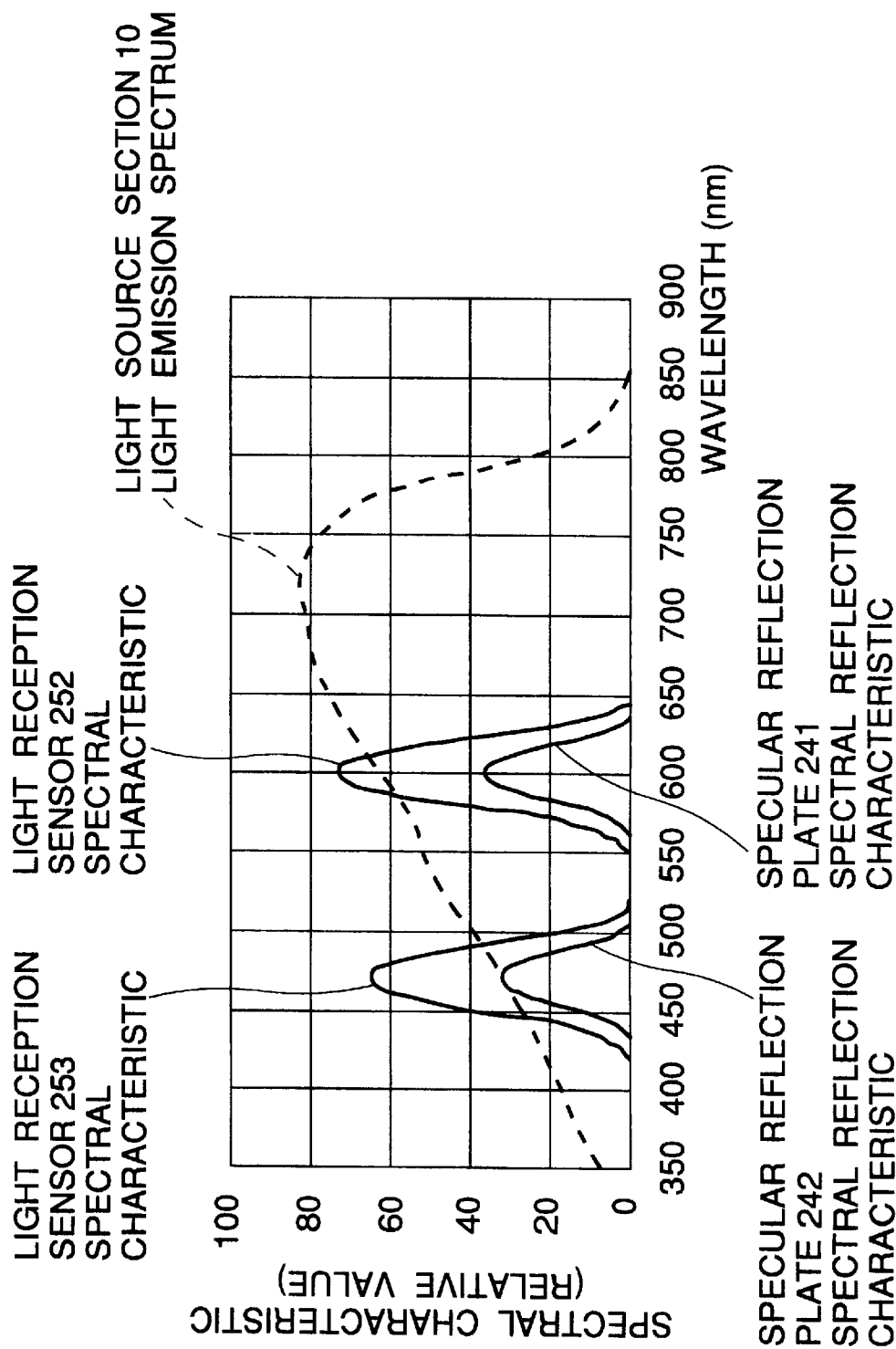
FIG. 24 is a graph to show the spectral characteristics of sensors and specular reflection plates of third means for detecting specularly reflected light spots from a plurality of specular reflection plates at the same time, shown in the first embodiment.
Figure 25:
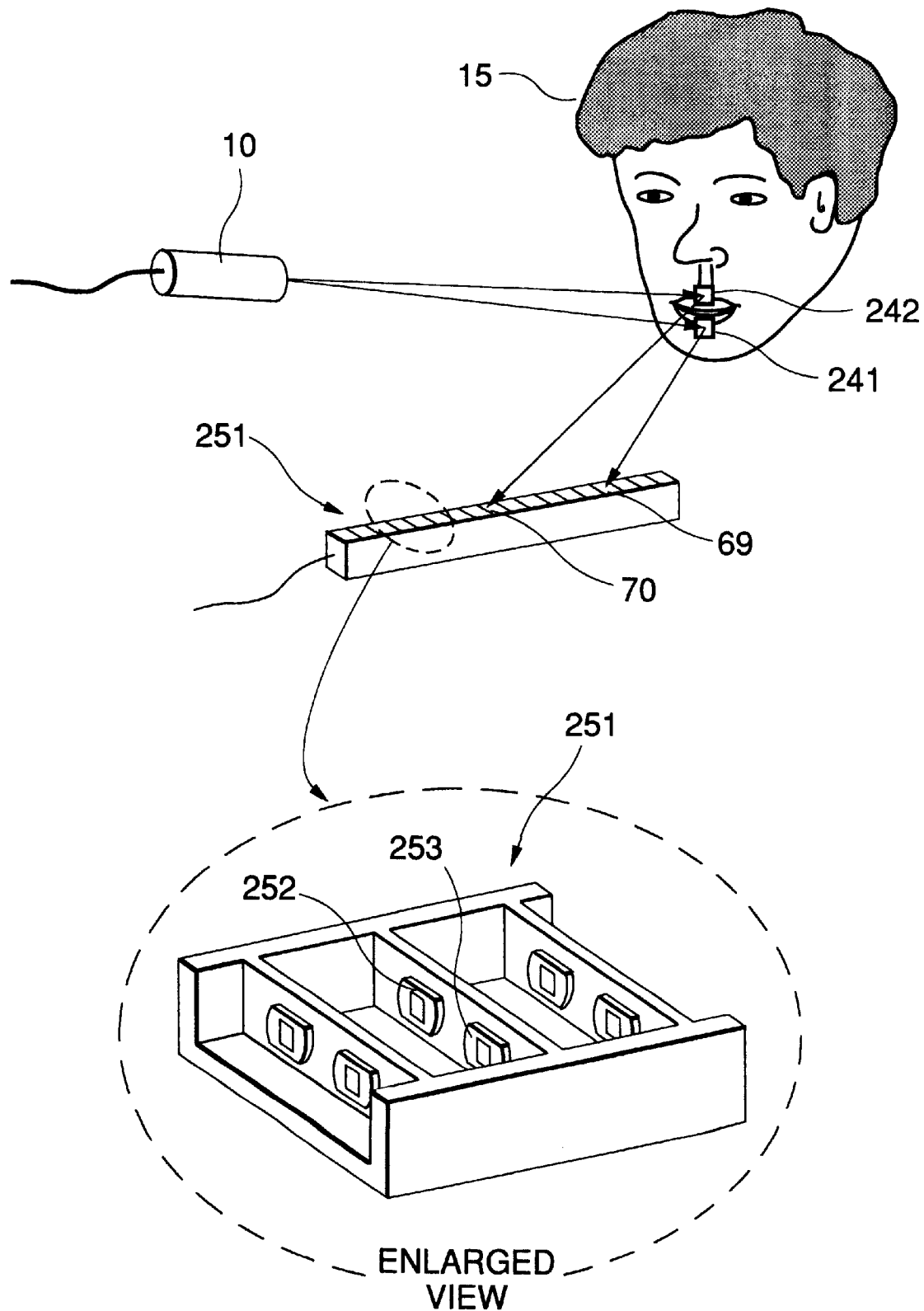
FIG. 25 is an illustration to show the composition of the third means for detecting specularly reflected light spots from a plurality of specular reflection plates at the same time, shown in the first embodiment.
Figure 26:
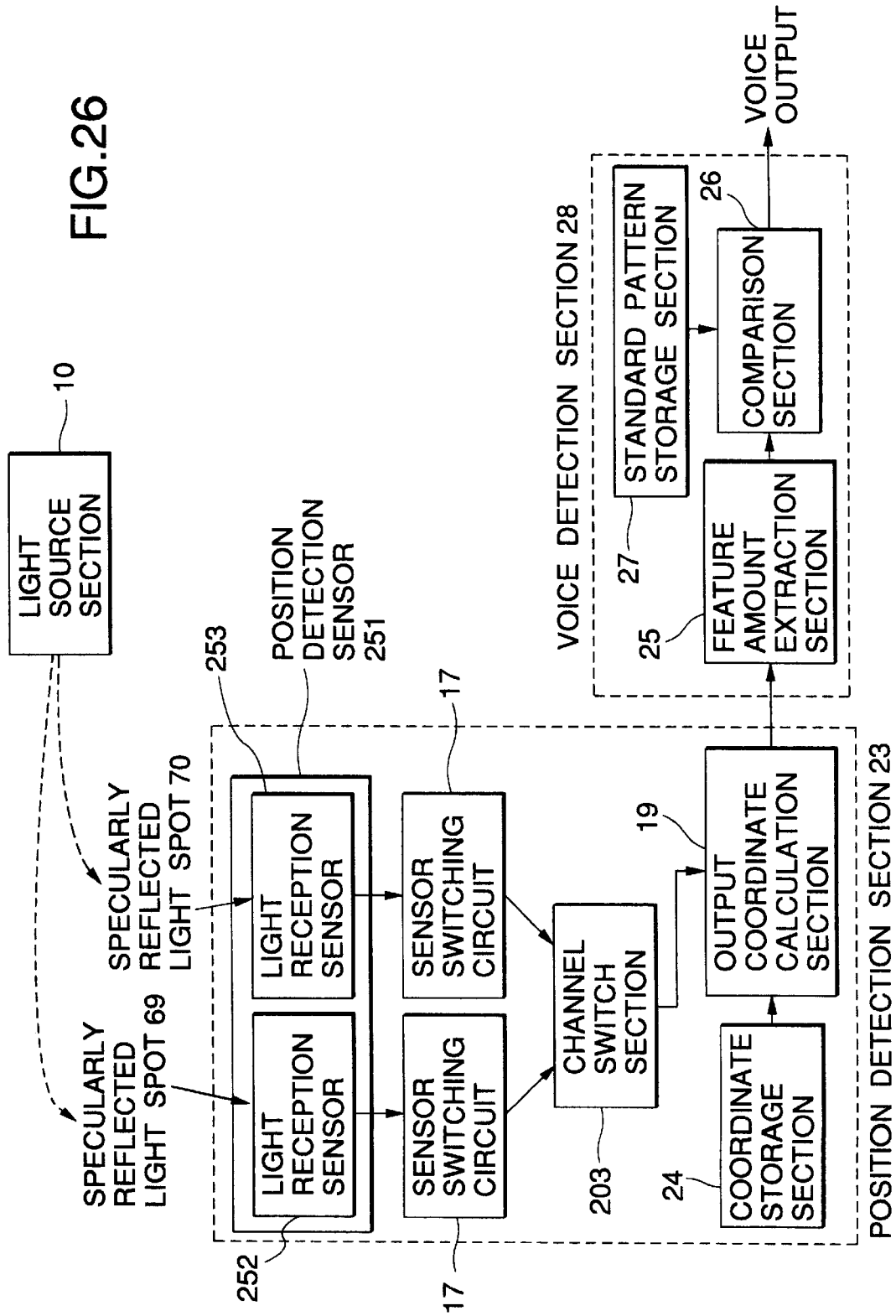
FIG. 26 is a block diagram to show a configuration example of the third means for detecting specularly reflected light spots from a plurality of specular reflection plates at the same time, shown in the first embodiment.

The third means uses two types of specular reflection plates 241 and 242 different in spectral characteristic. The spectral reflection characteristics of the specular reflection plates 241 and 242 are separate to such a degree that their spectral reflection components do not overlap each other on practical use (see FIG. 24). The specular reflection plate 241 comprises a band-pass filter having a center wavelength of 600 nm put on the surface of a specular reflection plate made of aluminum mylar. Likewise, the specular reflection plate 242 comprises a band-pass filter having a center wavelength of 470 nm put on the surface of a specular reflection plate made of aluminum mylar. A position detection sensor 251 is made up of pairs of light reception sensors 252 and light reception sensors 253, each sensor 252 and each sensor 253 placed near, having faces on which filters having spectral transmission factors equivalent to those of the specular reflection plates are put so as to have two types of spectral characteristics corresponding to the spectral characteristics of the specular reflection plates (see FIG. 25). One light source section 10 is provided and the spectral characteristic of the light source section 10 includes the spectral reflection characteristic range of both the specular reflection plates 241 and 242. FIG. 24 shows an example of the spectral characteristics of the specular reflection plates 241 and 242, the light reception sensors 252 and 253, and the light source section 10. The spectral characteristics are not limited to the values shown in the figure and may be an infrared region or an ultraviolet region. According to the composition, the specularly reflected light from the specular reflection plate 241 lies in the same wavelength range as the light reception sensor 252 and thus can be detected by the light reception sensor 252, but has a wavelength range different from that of the light reception sensor 253, thus output voltage of the light reception sensor 253 can be provided with a proper threshold value so that the specularly reflected light is not detected by the light reception sensor 253. Likewise, the specularly reflected light from the specular reflection plate 242 lies in the same wavelength range as the light reception sensor 253 and thus can be detected by the light reception sensor 253, but has a wavelength range different from that of the light reception sensor 252, thus output voltage of the light reception sensor 252 can be provided with a proper threshold value so that the specularly reflected light is not detected by the light reception sensor 252. The positions of the specularly reflected light spots 69 and 70 can be separated from each other for detection. The specular reflection plates 241 and 242 are placed at positions near a median 112, whereby the specularly reflected light spots 69 and 70 are placed so that they are projected on the position detection sensor 251 at the same time. FIG. 26 is a block diagram of a position detection section 23 for the third means. Position information of the specularly reflected light spot 69 output from the light reception sensor 252 is contained in timing information from a shift register 41 (FIG. 4) of a sensor switching circuit 17. Likewise, position information of the specularly reflected light spot 70 output from the light reception sensor 253 is also contained in timing information from a shift register 41 of another sensor switching circuit 17. The two position information pieces are sent to an output coordinates calculation section 19 alternately through a channel switch section 203. The position information of the specularly reflected light spots projected on the light reception sensors 252 and 253 of the position detection sensor 251 is determined by the output coordinates calculation section 19 and output to a feature extraction section 25 of a voice detection section 28. In the technology, the signals of the light reception sensors 252 and 253 of the position detection sensor 251 may be output directly to two output coordinates calculation sections 19 (not shown) in parallel for processing not via the channel switch section 203. Although the third means uses two types of specular reflection plates 241 and 242 and two types of light reception sensors 252 and 253, more than two position detection sensors and more than two pairs of specular reflection plates and light reception sensors corresponding to each other in spectral characteristic can also be used, this configuration being contained in the technology.

Figure 27:
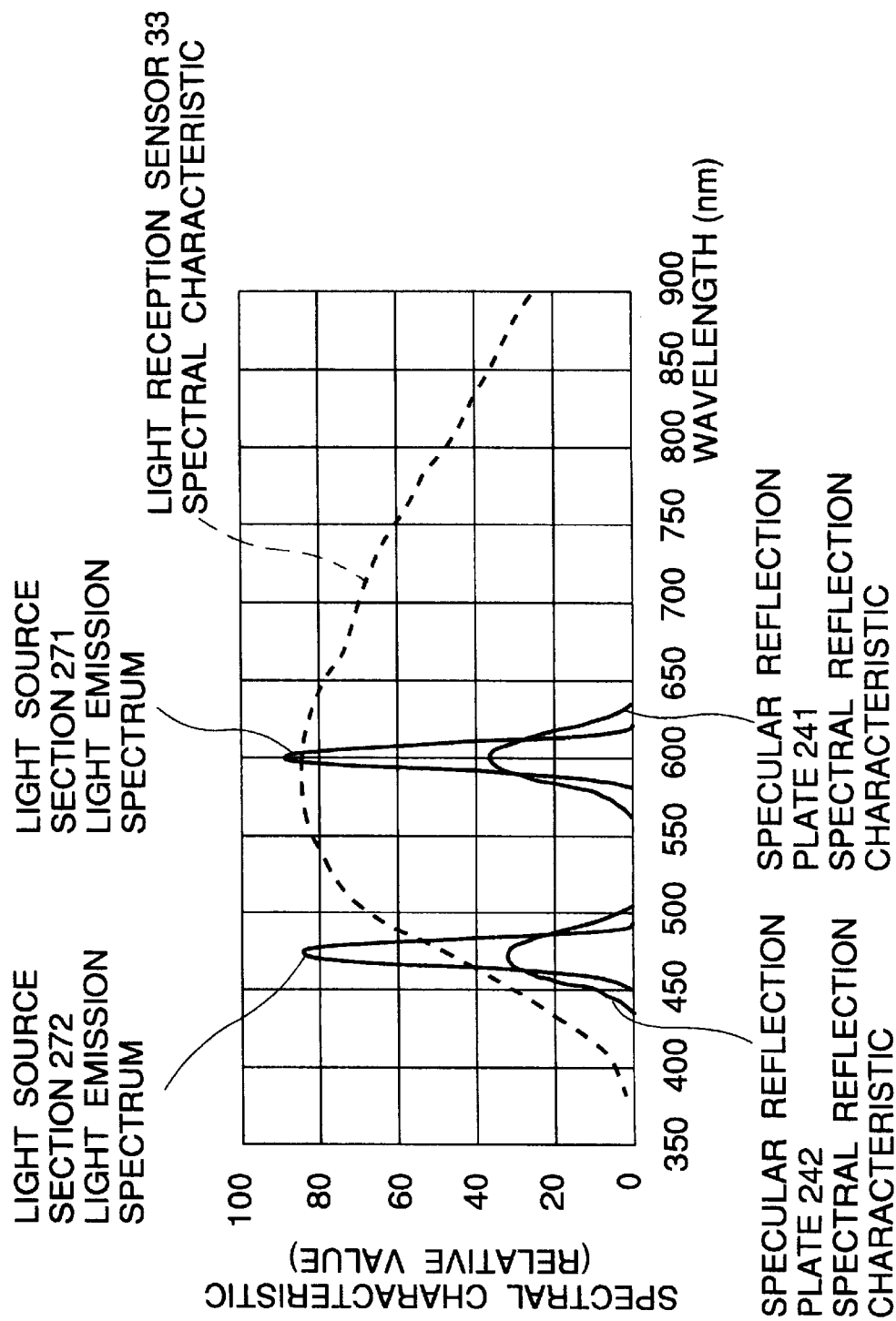
FIG. 27 is a graph to show the spectral characteristics of light sources and specular reflection plates of fourth means for detecting specularly reflected light spots from a plurality of specular reflection plates at the same time, shown in the first embodiment.
Figure 28:
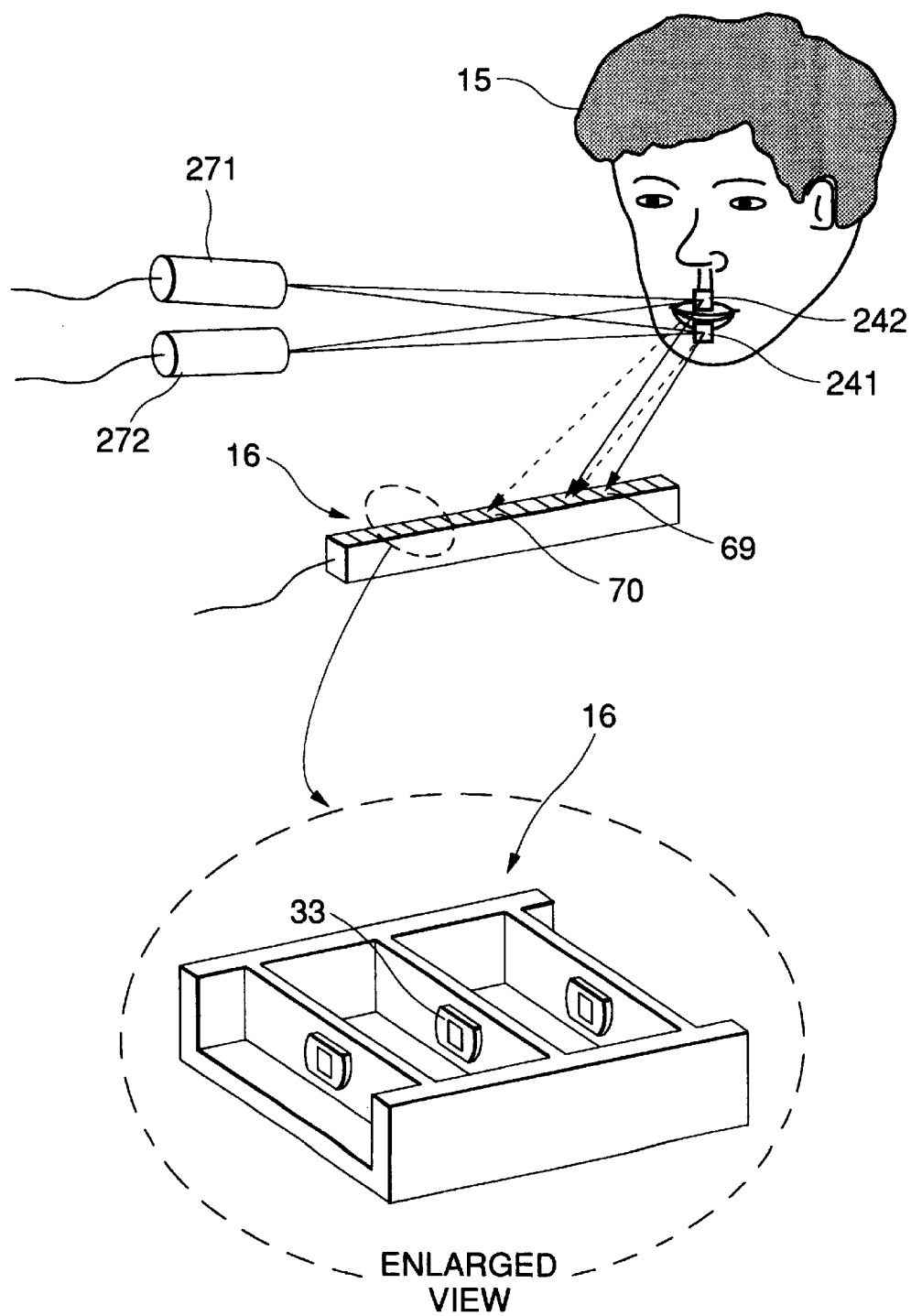
FIG. 28 is an illustration to show the composition of the fourth means for detecting specularly reflected light spots from a plurality of specular reflection plates at the same time, shown in the first embodiment.

The fourth means uses only one position detection sensor 16 and two types of light sources and two types of specular reflection plates different in spectral reflection characteristic. A light source section 10 uses two light sources 271 and 272 different in spectral characteristic. As the two specular reflection plates, the same specular reflection plates 241 and 242 as used with the third means are used (see FIG. 27). The light sources 271 and 272 and the specular reflection plates 241 and 242 are placed as shown in FIG. 28. The light source 271 uses a 605-nm red light emitting diode and the light source 272 uses a 470-nm green light emitting diode. The specular reflection plate 241 corresponding to the light source 271 has a center wavelength of 600 nm and the specular reflection plate 242 corresponding to the light source 272 has a center wavelength of 470 nm. The positions of specularly reflected light spots 69 and 70 irradiated with light from the different light sources 271 and 272 are projected on the plane of one position detection sensor 16. The position detection sensor 16 includes the spectral characteristic range of the light sources 271 and 272 and the spectral reflection characteristic range of both the specular reflection plates 241 and 242. FIG. 27 shows an example of the spectral characteristics of the specular reflection plates 241 and 242, the light sources 271 and 272, and the position detection sensor 16. The spectral characteristics are not limited to the values shown in the figure and may be an infrared region or an ultraviolet region. According to the composition, the specularly reflected light from the specular reflection plate 241 lies in the same wavelength range as the light source 271 and thus can be detected by the position detection sensor 16, but has a wavelength range different from that of the light source 272, thus output voltage of the position detection sensor 16 can be provided with a proper threshold value so that the specularly reflected light is not detected by the position detection sensor 16. Likewise, the specularly reflected light from the specular reflection plate 242 lies in the same wavelength range as the light source 272 and thus can be detected by the position detection sensor 16, but has a wavelength range different from that of the light source 271, thus output voltage of the position detection sensor 16 can be provided with a proper threshold value so that the specularly reflected light is not detected by the position detection sensor 16. The positions of the specularly reflected light spots 69 and 70 can be separated from each other for detection. The specular reflection plates 241 and 242 are placed at positions near a median 112, whereby the specularly reflected light spots 69 and 70 are placed so that they are projected on the position detection sensor 16 at the same time.

Figure 29:
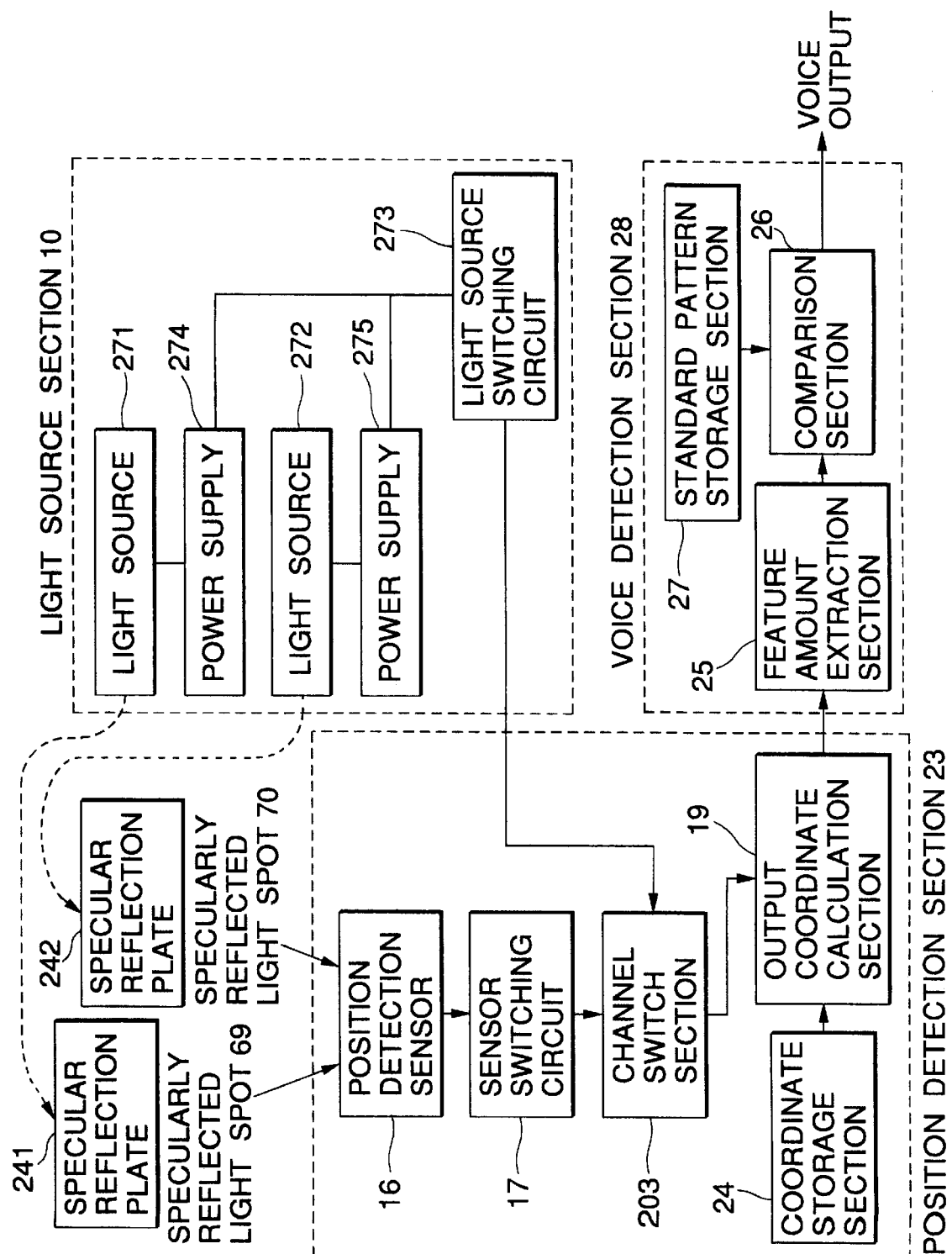
FIG. 29 is a block diagram to show a configuration example of the fourth means for detecting specularly reflected light spots from a plurality of specular reflection plates at the same time, shown in the first embodiment.

To detect the specularly reflected light spots 69 and 70 separately, the light sources 271 and 272 are switched by a light source switching circuit 273 so that they blink alternately. A synchronizing signal is sent from the light source switching circuit 273 to a channel switch section 203 so as to synchronize with blinking of the light sources, thereby determining which of the specularly reflected light spots 69 and 70 the position signal corresponds to. (See FIG. 29.)

Although the fourth means uses two pairs of light sources and specular reflection plates equivalent in spectral characteristic, more than two pairs of light sources and specular reflection plates can also be used to detect a greater number of point positions, this configuration being contained in the technology. We have discussed the four means each for detecting a number of specularly reflected light spot positions at the same time; the means can also be combined to detect a greater number of points at the same time, this configuration being also contained in the technology, of course.

Next, a voice detection method using the technology is shown. For simplicity, separate detection of two specularly reflected light spot positions by the simplest voice detection apparatus shown in FIGS. 1 and 2 will be discussed. A method of detecting the relationship between phonemes and positions of reflected light spots 69 and 70 when vowels /a, i, u, e, o/ are input while they are separated one vowel (a single breath) at a time as a voice input example will be discussed. First, with lips closed, the coordinates of the reflected light spot positions from the specular reflection plates 12 put on the lip median inner peripheral upper part b1 (53) and the lip median inner peripheral lower part b2 (54) are detected by the position detection sensor 16 and are stored in a coordinates storage section 24 of the output coordinates calculation section 19 as initial values X01 and X02 of the positions of the specularly reflected light spots 69 and 70 from the positions where the specular reflection plates are put.
[Mathematical 5]
X01: Coordinates of reflected light spot 70 from b1 (53) with lips closed
X02: Coordinates of reflected light spot 69 from b2 (54) with lips closed Next, a detection method of the positions of the specularly reflected light spots 69 and 70 when a speech sound is produced will be discussed. In voice input separated a single sound at a time, the lip shape tends to stop for about 250 ms at the end of the utterance. The lip shape in the stop state is detected as two coordinate points of the position of the reflected light spot 70 from the lip median inner peripheral upper part b1 (53) and the position of the reflected light spot 69 from the lip median inner peripheral lower part b2 (54) as follows: Motions of the positions of the specularly reflected light spots 69 and 70 are time-differentiated and if the differential value is within a tolerance and the state continues for a predetermined time or longer, it is assumed that a move of the reflected light spot position is small, and the coordinate point is detected as a stop point. In the embodiment, the point where the average value of dX/dt is less than 33.3 mm/s at 112-ms time intervals is adopted as a stop point. This corresponds to the case where the specularly reflected light spot position does not move from the cell 34 of the position detection sensor 16 receiving the specularly reflected light spot 69, 70 to its adjacent cell during 112 ms. The value is adopted in the placement of the experimental apparatus; the setup value needs to be changed with change in the dimensions or shape of the experimental apparatus or change in the positions of putting the specular reflection plates 12. The coordinates of the reflected light spots 69 and 70 from the lip median inner peripheral upper part and the lip median inner peripheral lower part thus detected are denoted by the following symbols:
[Mathematical 6]
X11: Coordinates of stop point of specularly reflected light spot 70 from b1 (53)
X12: Coordinates of stop point of specularly reflected light spot 69 from b2 (54)

The initial coordinates X01 and X02 with lips closed are subtracted from the coordinates of the stop points, thereby calculating movement distances to the reflected light spot stop points. These movement distances are denoted by the following symbols:
[Mathematical 7]
Movement distance of specularly reflected light spot 70 from b1 (53): X1=X11−X01
Movement distance of specularly reflected light spot 69 from b2 (54): X2=X12−X02

Experiment was repeated three times each for three males in thirties to forties. To suppress face motion of a speaker 15, the speaker 15 gave utterance with the head of the speaker 15 lightly pressed against the head fixing rod 18 as shown in FIG. 1. A specular reflection member f was placed on the top of a regio nasalis 121 in order to monitor the face motion (see FIG. 5). The position of putting the specular reflection member f (59) was shifted about 2 mm to the right from the median face so that the specularly reflected light from the specular reflection member f is not incident on the light reception plane 22 of the position detection sensor 16. A move of the reflected light spot position at the utterance time is small and lies within the range of ±5 mm for all the three subjects. It is sufficiently small as compared with the movement distance of the position of the specularly reflected light spot 69, 70 from the lip (to 400 mm). Thus, the face motion was ignored and the positions of the specularly reflected light spots 69 and 70 from the lips were calculated. The movement distances X1 and X2 of the specularly reflected light spots produced by vocalization vary from one subject to another. It is estimated that the coordinate position difference between the subjects is caused by the vocalization method difference, the feature and lip shape differences, the specular reflection plate 12 putting position difference, the height difference from the position detection sensor 16 to the face of the speaker 15, and the like. However, in repetitive experiment of the same speaker, the reproduciability of the coordinate position lies within ±3.2 degrees and is excellent. The direction for each phoneme indicated by the X1 and X2 coordinates shows a similar trend independently of the speakers.

Figure 13:
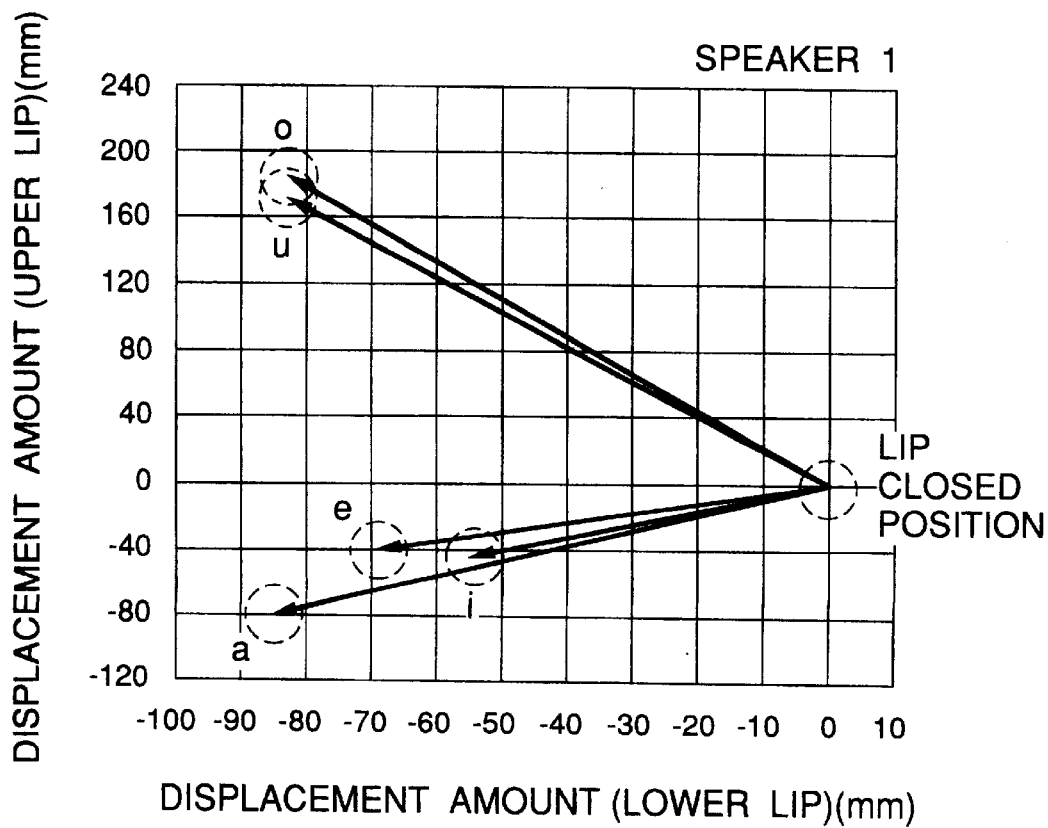
FIG. 13 is an illustration to show feature vectors of vowels of speaker 1 in the first embodiment of the invention.

FIG. 13 is a feature vector graph of a male subject in forties with movement distance X1 of the specularly reflected light spot 70 from the lip median inner peripheral upper part b1 (53) plotted on a vertical axis and movement distance X2 of the specularly reflected light spot 69 from the lip median inner peripheral lower part b2 (54) plotted on a horizontal axis. The reflected light spot position coordinates with his lips closed correspond to the origin on the graph and the reflected light spot position stop points in vowels /a, i, u, e, o/ are indicated as vectors from the origin (a*, i*, u*, e*, o*). From the graph, the vectors a*, i*, and e* of the vowels /a, i, e/ have the same directivity and form one group. Likewise, the vectors u* and o* of the vowels /u, o/ also have the same directivity different from that of a*, i*, e* and form one group. Thus, the vowels /a, i, e/ and the vowels /u, o/ can be classified as voices having different vocal organ shapes. In phonetics, the vowels /u, o/ are called labial and the vowels /a, i, e/ are non-labial. Thus, according to the embodiment, it was shown that voices can be classified. The feature amount extraction section 25 calculates the direction of the vector corresponding to the phoneme indicated by X1 and X2, namely, angle range and a comparison section 26 compares the angle range with the standard angle range of each phoneme previously stored in a standard pattern storage section 27, whereby input phonemes can be classified.

According to Murakami et al, when a speaker continuously utters, the voice occurrence time is about 120 ms per mora in Japanese although it is less remarkable than voice input separated a single sound at a time. Most of the time is consumed for a vowel. Experiment revealed that when change is made from a consonant to a vowel during one mora or from a vowel to a consonant or vowel in the next mora, the reflected light spot motion momentarily stops. The still time is about 10–30 ms. Such a still point is found by the fact that the differential value of the reflected light spot position becomes zero. The second-order differential of the reflected light spot position is found and the point of inflection where the value becomes zero is captured, whereby the next still point can also be predicted. The technology also enables detection of the position coordinates of phonemes at the continuous utterance time although the detection accuracy is inferior to that of voice input separated a single sound at a time.

(Second Embodiment)

In a second embodiment of the invention for voice classification, the same apparatus as in the first embodiment is used to specular reflection plates 12 are put on lip median outer peripheral upper part a1 (51) and lip median outer peripheral lower part a2 (52) and voices are separated by a similar method to that in the first embodiment (see FIG. 5). A method of detecting the relationship between phonemes and specularly reflected light spot positions when vowels /a, i, u, e, o/ are input while they are separated one vowel (a single sound) at a time as a voice input example will be discussed. First, with lips closed, the coordinates of the positions of specularly reflected light spots 69 and 70 from the specular reflection plates 12 put on the lip median outer peripheral upper part a1 (51) and the lip median outer peripheral lower part a2 (52) are detected and are stored in a coordinate storage section 24 of an output coordinate calculation section 19 as initial values X03 and X04 of the positions of specularly reflected light spots 69 and 70 from the positions where the specular reflection plates are put.

[Mathematical 8]

X03: Coordinates of reflected light spot 70 from a1 (51) with lips closed

X04: Coordinates of reflected light spot 69 from a2 (52) with lips closed

Next, the coordinates of the stop points of the reflected light spots 69 and 70 from the lip median outer peripheral upper part a1 (51) and the lip median outer peripheral lower part a2 (52) at the utterance time detected as in the first embodiment are denoted by the following symbols:

[Mathematical 9]

X13: Coordinates of stop point of specularly reflected light spot 70 from a1 (51)

X14: Coordinates of stop point of specularly reflected light spot 69 from a2 (52)

The initial coordinates with lips closed are subtracted from the coordinates of the stop points, thereby calculating movement distances to the reflected light spot stop points. These movement distances are denoted by the following symbols:

[Mathematical 10]

Movement distance of specularly reflected light spot 70 from a1 (51): x3=X13−X03

Movement distance of specularly reflected light spot 69 from a2 (52): x4=X14−X04

Figure 14:
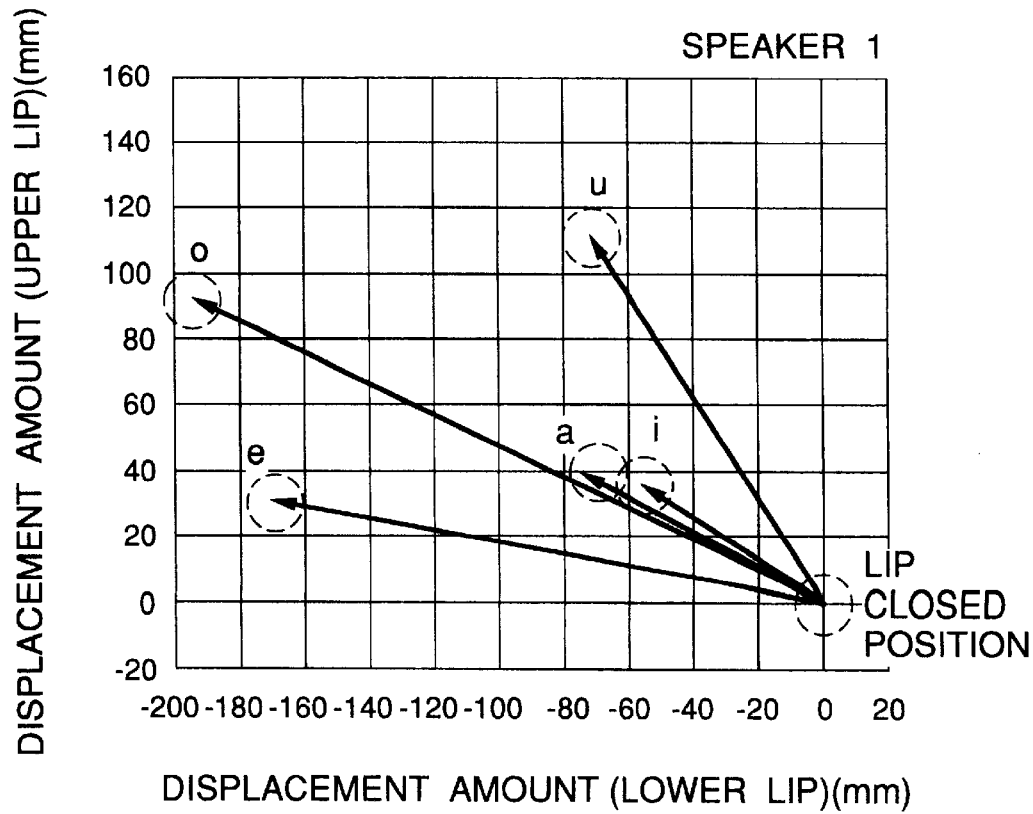
FIG. 14 is an illustration to show feature vectors of vowels of speaker 1 in the second embodiment of the invention.

The speaker is the same male in forties as in the first embodiment. FIG. 14 is a graph with movement distance x3 of the specularly reflected light spot 70 from the lip median outer peripheral upper part a1 (51) plotted on a vertical axis and movement distance x4 of the specularly reflected light spot 69 from the lip median outer peripheral lower part a2 (52) plotted on a horizontal axis. The position coordinates of the specularly reflected light spot 69, 70 with his lips closed are the origin on the graph and the specularly reflected light spot position stop points in vowels /a, i, u, e, o/ are indicated as vectors from the origin (a*, i*, u*, e*, o*). From the graph, the vectors a*, i*, and o* of the vowels /a, i, o/ have the same directivity and form one group. The vector u* of the vowel /u/ and the vector e* of the vowel /e/ differ in directivity. Thus, the vowels /a, i, o/, the vowel /u/, and the vowel /e/ can be classified as voices having different vocal organ shapes on the lip median outer periphery a1 (51), a2 (52). In another speaker, vector direction similarity, which is apparently different, was shown (see FIG. 15). Thus, also in the second embodiment, it was shown that voices can be classified. However, comparison between FIGS. 14 and 15 also suggested that it is desirable to specify speakers to improve the voice detection accuracy. A feature amount extraction section 25 calculates the direction of the vector corresponding to the phoneme indicated by X3 and X4, namely, angle range and a comparison section compares the angle range with the standard angle range classifying each phoneme previously stored in a standard pattern storage section 27, whereby input phonemes can be classified.

As seen in FIG. 14, the vectors a*, i*, and o* of the vowels /a, i, o/ have the same directivity, but the vectors a* and i* of the vowels /a, i/ and the vector o* of the vowel /o/ differ remarkably in length. This phenomenon is useful information for voice classification, but if the speaker produces the same phoneme sound, the vector length changes with the lip opening size, for example, the speaker voice magnitude. Thus, if voice is detected simply according to the vector length, an error frequently occurs and it is difficult to detect voice precisely. However, if lips move as in usual conversation, the vector directivity for representing a vowel little changes if the same speaker is applied, thus the technology provides a highly accurate voice detection method. The vowels can be classified into the four types of /a, i/, /u/, /e/, and /o/ by combining the detection methods of the first and second embodiments. For stricter voice detection, placement of the specular reflection plates 12 on the skin near median 112, of regio mentalis 123, regio suprahyoidea 128, and regio cervicalis mediana 132 as well as regio oralis 122 is also contained in the technology, of course.

(Third Embodiment)

Figure 16:
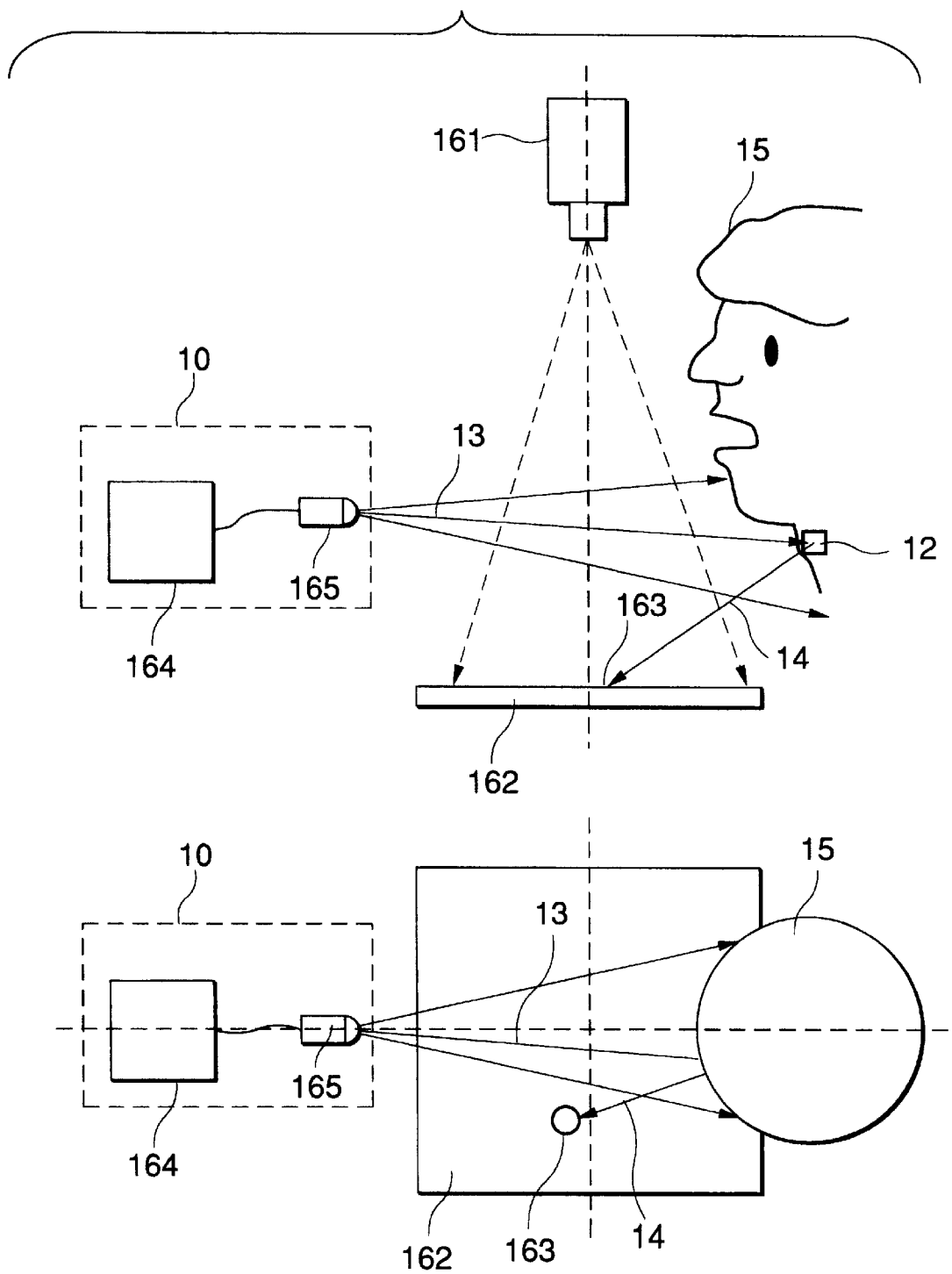
FIG. 16 is an illustration to show a basic configuration of a voice detection apparatus used with third and fourth embodiments of the invention.
Figure 17:
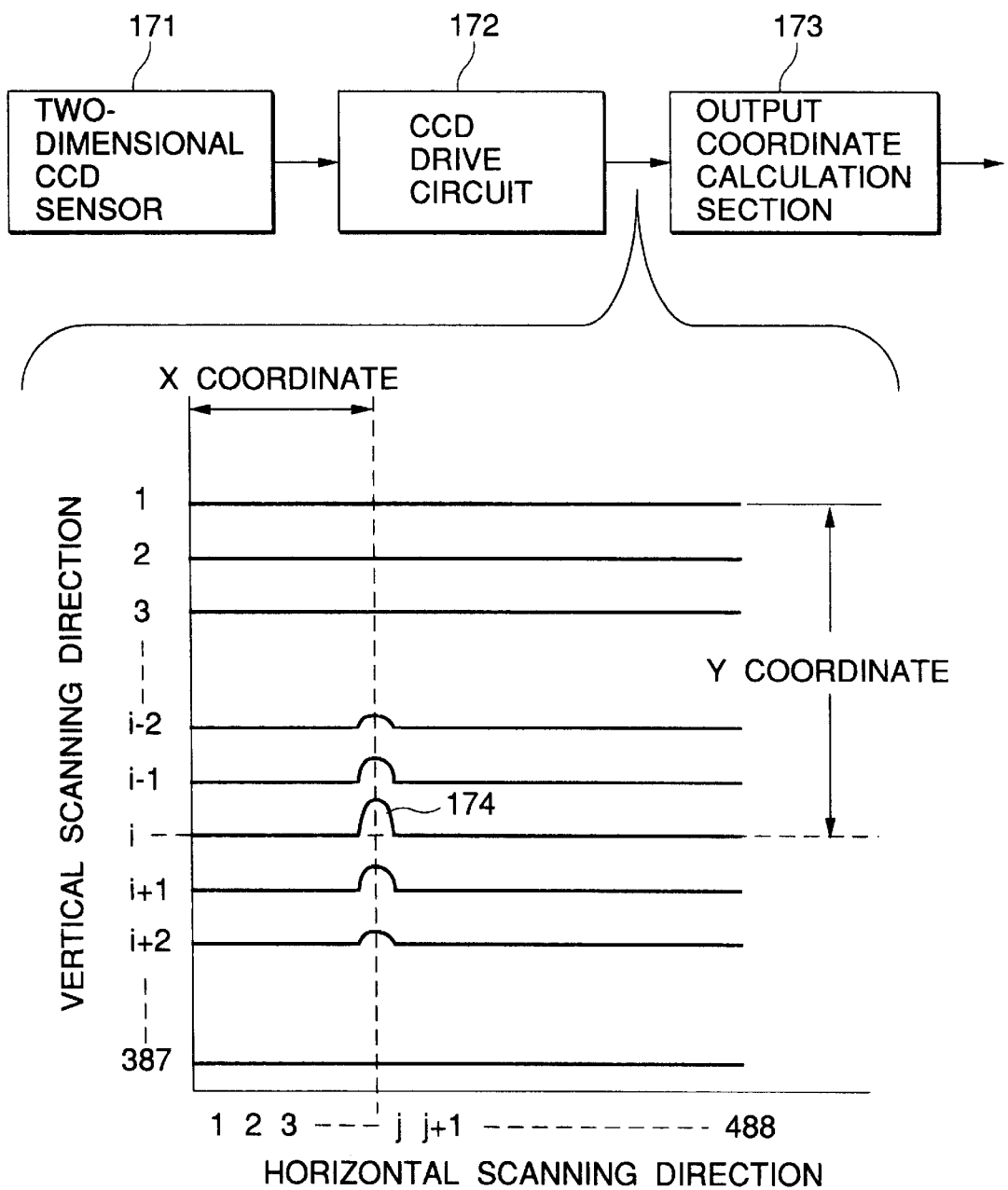
FIG. 17 is an illustration to explain CCD sensor output.

In the above-described embodiment, motion of portions of vocal organs and periphery thereof in the proximity of the median 112 is detected at the positions of the specularly reflected light spots 69 and 70 from the specular reflection plates 12 and voices are classified. In a third embodiment of the invention, a technology of placing specular reflection plates 12 at points other than those in the proximity of the median 112 and detecting vocal organ motion at the specularly reflected light spot positions from the specular reflection plates 12 will be discussed. To place the specular reflection plates 12 at points other than those in the proximity of the median 112, the projection positions of the specularly reflected light spots swing from side to side of the median 112 unlike those in the first or second embodiment. Thus, most of the locus is projected at positions deviating from the line where the human body median face crosses a light reception section plane 22. Therefore, a sensor for receiving two-dimensional information becomes necessary as a position detection sensor for detecting the specularly reflected light spot positions. The embodiment uses a video camera using two-dimensional CCD of image size 12.7 mm having 488 vertical pixels and 378 horizontal pixels. FIG. 16 shows the configuration of a detection apparatus and placement of the components of the detection apparatus. The detection apparatus comprises a light source section 10, a specular reflection plate 12, a screen 162, and a two-dimensional CCD camera 161. The light source section 10 is made up of a light emitting diode 165 and a power supply circuit 164. In experiment, a red light emitting diode having a center wavelength of 580 mm was used so that a specularly reflected light spot 163 can be visually checked. An infrared light emitting diode can also be used to as to hidden motion of a ray of light. A ray of light 13 from the light source section 10 is applied to the specular reflection plate 12 placed at a lower jam part point e (58) in the vicinity of a place where a regio suprahyoidea 128, a trigonum submandibulare 129, a trigomun caroticum 131, and a regio cervicalis mediana 132 cross each other. Specularly reflected light 14 from the specular reflection plate 12 changes in direction in response to the position and angle of the lower jam part point e (58) and is projected on the screen 162 as a specularly reflected light spot 163. The image of the specularly reflected light spot 163 is picked up by the two-dimensional CCD camera 161 and an output signal 174 is output via a CCD drive circuit 172 to an output coordinate calculation section 173 as horizontal scanning, vertical scanning direction signal of a two-dimensional CCD sensor 171 as shown in FIG. 17. The specularly reflected light spot 163 projected on the screen 162 has a strength several times as strong as that of a portion where the specularly reflected light spot 163 is not projected, and a threshold value is set to detect the specularly reflected light spot 163, whereby if the apparatus is used in a building, the ambient light effect can be easily removed and only the specularly reflected light spot 163 can be extracted. The x axis coordinate of the specularly reflected light spot 163 is found according to the time from the horizontal scanning start signal of the two-dimensional CCD and the y axis coordinate can be found according to the vertical scanning time. To more ensure the detection accuracy, a strongly monochromatic light emitting diode is used as a light source and a band-pass optical filter corresponding to the light emitting wavelength of the light emitting diode is inserted in the optical path between the specularly reflected light spot 163 and the two-dimensional CCD for cutting off a ray of light having a different spectral characteristic, whereby the ambient light effect can be decreased for detecting the specularly reflected light spot 163 with high contrast. The power supply circuit 164 is provided with a switching circuit function and the light emitting diode 165 is blinked for each frame in synchronization with a drive frequency of the two-dimensional CCD camera 161, whereby a 1-frame image signal while the light emitting diode 165 is on is stored in a frame storage unit and the difference between the frame image signal and the next frame image signal while the light emitting diode 165 is off is found, whereby the difference between the two-dimensional CCD output frames, namely, only the specularly reflected light spot 163 can be detected. In this case, the position signal sampling period is doubled, namely, 1/30 sec.

In the embodiment, as voice classification experiment, from closed lips, vowels /a, i, u, e, o/ were pronounced one at a time and the output coordinates calculation section 173 found the x-y position coordinates of the specularly reflected light spot 163 specularly reflected from the specular reflection plate 12 placed at the lower jaw part e (58) and projected on the screen 162. The subject was a male in forties and was taken images thereof while he uttered the vowels from the closed lip state and closed his lips. FIG. 18 shows the measurement results of the loci of the specularly reflected light spots 163 projected on the screen 162 by specularly reflected light from the specular reflection plate 12 placed at the lower jaw part e (58). The origin of the graph denotes the position of the specularly reflected light spot 163 projected from the lower jaw part e (58) with the lips closed. The end point of each phoneme on the graph is the stop point position coordinates at the final stage of pronunciation. If the specular reflection plate 12 is put on the right as the observer faces the human body, the loci of the specularly reflected light spots accompanying vocalization of the vowels on the graph move counterclockwise from the third quadrant to the fourth quadrant in the order of /a/, /o/, /e/, /u/, and /i/. Thus, the vowel types can be classified according to the locus between the origin position with the lips closed and the stop point position at the final stage of pronunciation or the direction of the vector connecting the two points. The standard vector direction for each voice previously stored in a storage section is compared with the measurement result by a comparison section 26, thereby enabling voice classification. Although the embodiment uses the two-dimensional CCD camera, placement of a two-dimensional position detection sensor on a screen section for directly detecting reflected light is also contained in the technology. The specular reflection plate 12 may be put on any point other than the lower jaw part e (58).

(Fourth Embodiment)

In a fourth embodiment of the invention, locus data is found from the position coordinates of a specularly reflected light spot detected in the apparatus configuration of the third embodiment and pattern recognition of the data is executed, thereby detecting a phoneme (see FIG. 16). The subject was a specific male speaker in forties and a specular reflection plate 12 was placed at lower jaw part e (58) as in the third embodiment. Five vowels /a/, /i/, /u/, /e/, and /o/ were separated one sound at a time and pronounced clearly in usual voice volume. They were vocalized at intervals of several seconds so as to prevent the same utterance and the vocalized vowel order was at random. First, for use as standard map data, each vowel was input five times (25 times in total) and the loci of the specularly reflected light spot coordinates were found. Each phoneme data piece was isolated according to the time interval between the instant at which the y component of the specularly reflected light spot started to move and the instant at which it stopped. In the apparatus of the embodiment, if the movement distance of the specularly reflected light spot is within three pixels between two contiguous frames and this continues on three frames or more, the spot is assumed to stop. FIG. 30 (31) shows a part of a graph with a horizontal axis as a time axis with the isolated locus disassembled into x and y components. The vertical axis represents the pixel positions in the vertical direction of a CCD sensor and the horizontal axis represents the number of image frames in terms of time.

For the map data, vowels as recognition data are collected each 35 (175 in total) by the same method. The amplitude and duration of the x and y components of the specularly reflected light spot vary depending on the voice magnitude at the vocalization time and the time interval difference. If pattern recognition is executed with the form intact, a large error occurs and the recognition rate lowers. Normally, to recognize such a time series pattern, a method of dynamically normalizing the time axis is used to compare the time series pattern of the recognition data with the time series pattern of standard map data. Dynamic programming (DP matching method) is available as a representative technique. In the embodiment, for the differential values of the x and y components, the time axis is normalized by the DP matching method for each component. The method is as follows:

Assume that two time series patterns A and B are represented by expression (9).

[Mathematical 11]

$$A = a1, a2, \ldots ai, \ldots aI$$

$$B = b1, b2, \ldots bj, \ldots bJ \quad (9)$$

where ai denotes the i-th frame of A, bj denotes the j-th frame of B, and I and J are the time lengths of A and B each as the total number of image frames.

Assuming that the distance between ai and bj is d (i, j), the distance D between A and B, (A, B), is found by calculating g (i, j) from 1 to I and from 1 to J in order according to expression (10) for finding g (I, J) and assigning g (I, J) to expression (11).

[Mathematical 12]

$$g(1, 1) = 2d(1, 1)$$

$$g(1, j) = g(1, j-1) + d(1, j)(1 < j <= J)$$

$$g(i, 1) = g(i-1, 1) + d(i, 1)(1 < i <= I)$$

$$g(i, j) = \min\{g(i, j-1) + d(i, j), g(i-1, j-1) + 2d(i, j), g(i-1, j) + d(i, j)\} \quad (10)$$

$$D(A, B) = g(I, J)/(I+J) \quad (11)$$

Since frame data of time series patterns handled in the embodiment is two dimensions, ai and bj in expression (9) are (Xai, Yai) and (Xbj, Ybj) respectively. For the same phoneme, the initial point position of the specularly reflected light spot may vary. To decrease this effect, the differential values of X and Y coordinates, (X'ai, Y'ai) and (X'bj, Y'bj), are assigned as frame data. Thus, distance d (i, j) is defined as in expression (12).

[Mathematical 13]

$$d(i, j) = \text{sqrt}\{(X'ai - X'bj)2 + (Y'ai - Y'bj)2\} \text{(sqrt means a square root)} (12)$$

The object to be recognized is A and the standard pattern is B(n) (n=1, 2, 3, 4, 5) where n means the standard pattern type, namely, vowel /a/, /i/, /u/, /e/, or /o/. Dn=D(A, B(n)) is calculated by the above-described method and the vowel of the standard pattern n giving the minimum Dn is adopted as the recognition result for the recognition data A. In the embodiment, five standard patterns are adopted for each phoneme, thus five values of Dn are found for each phoneme and the n with the minimum total of the values is assumed to be the recognition result for the recognition data A.

Table 1 lists the recognition rates provided by performing the processing.

The average recognition rate of the five vowels is 92.4% and it is found that the lower jaw part is an extremely excellent point as the voice detection point.

TABLE 1

| Vowel recognition rate | |
| --- | --- |
| Phoneme | Recognition rate |
| /a/ | 89.1% |
| /i/ | 100.0% |
| /u/ | 83.8% |
| /e/ | 97.3% |
| /o/ | 91.9% |
| Vowel average | 92.4% |

The DP matching method is used for pattern recognition in the embodiment; however, to execute stricter pattern recognition, any other technology such as a neuro-network can also be used.

Figure 19:
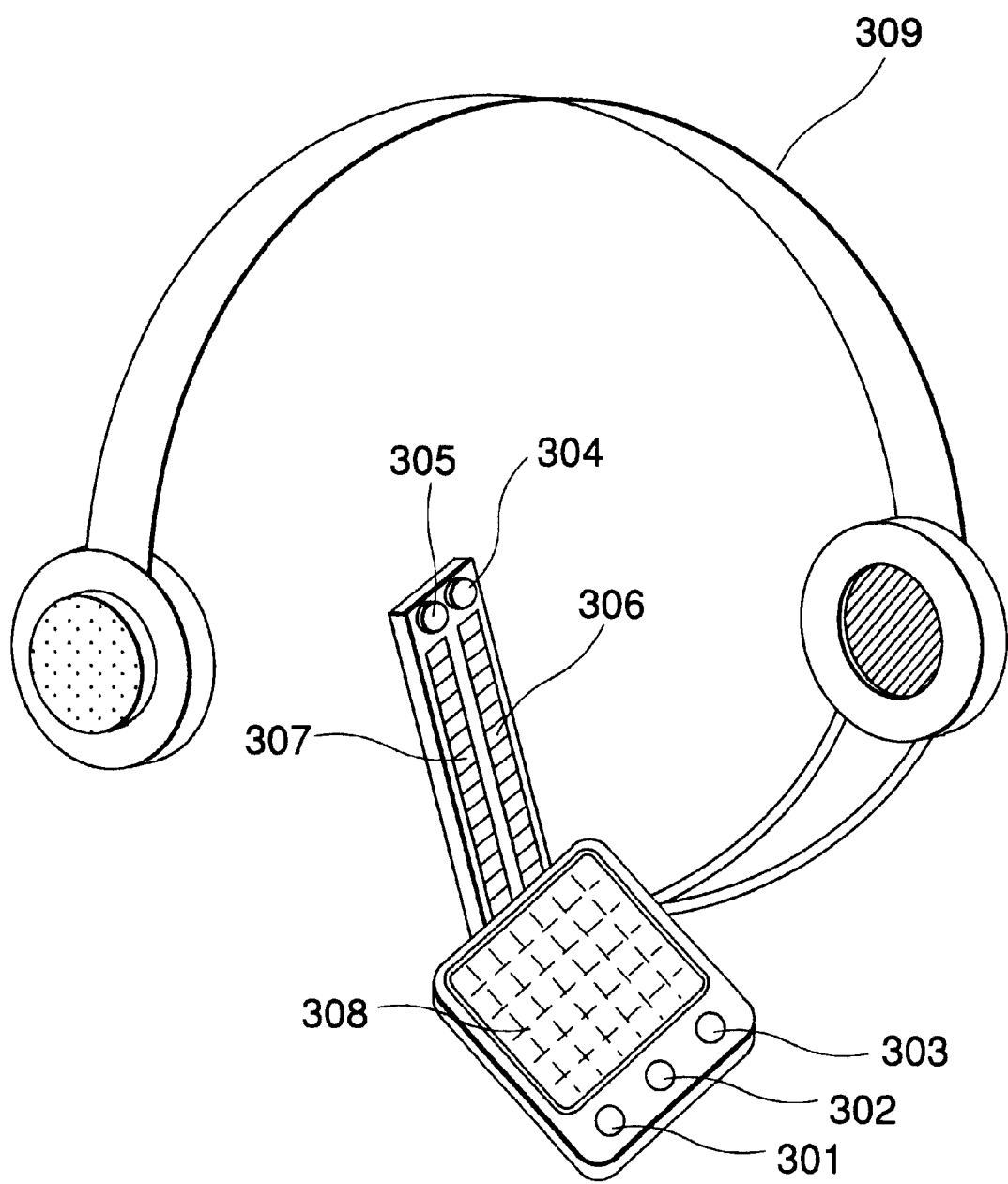
FIG. 19 is a perspective view to show a configuration example of a voice detection apparatus provided by combining the technologies of the invention described in the first to fourth embodiments.

Although only one specular reflection plate 12 is used in the embodiment, more than one specular reflection plate can also be used to raise the recognition rate and further the technologies of the first to third embodiments can also be combined. FIG. 19 shows a configuration example of the voice detection apparatus of the invention provided by using the technologies in combination. This voice detection apparatus comprises light sources 301, 302, 303, 304, and 305 each having a light emitting diode embedded, one-dimensional position detection sensors 306 and 307, and a two-dimensional position detection sensor 308, the components being integrated as a headset 309 that can be mounted on the head of a subject (speaker) 15. Thus, the projection positions of specularly reflected light spots from specular reflection plates (not shown) placed on the skin of vocal organs and periphery thereof of a subject on the one-dimensional position detection sensors 306 and 307 and the two-dimensional position detection sensor 308 do not change on practical use even if the whole head of the subject moves during the utterance.

In the invention, we have discussed mainly the points shown in FIG. 5 as the positions where the specular reflection plates are put, but useful feature amounts of voice and any other factors can also be extracted in other parts. The regio mentalis 123 is effective as a feature amount extraction point of vowels, phoneme /m/, etc. The regio buccalis 125 is effective for detecting vowels, labials, plosives, etc. The regio parotideomasseterica 127 is an important detection point for discriminating mouth motion of pronunciation from mouth motion of mastication. The fossa retromandibularis 130 is an effective detection point when a position move of the specular reflection plate is small and angle change of the specular reflection plate is mainly taken out as jaw motion. Further, the regio nasalis 121, particularly, pars alaris becomes an effective detection point for taking out a nasal sound or breathing. The regio infraorbitalis 124 becomes an effective measurement point for detecting vowel /i/, consonant /j/, a contracted sound, etc. The trigomun caroticum 131 is an excellent detection point as a point catching vibration of the vocal cords. The regio cervicalis mediana 132 is effective as a point catching motion of the vocal cords and particularly effective for detecting pitch information in vocalization. It is also a central detection point for detecting physiological action producing voice information noise components of swallowing, coughing, sneezing, yawning, belching, hiccupping, etc. Further, the detection points are also considered to be effective as technique of catching expression of crying, laughing, anger, joy, sorrow, surprise, fear, etc. Thus, the angle component detection method of the skin of vocal organs and periphery thereof in the invention has a feature that voice can be detected and any other information can be collected in a wider range of the skin portion as compared with the prior technology.

As we have discussed, according to the invention, the feature amount based on the surface angle of the skin of vocal organs and periphery thereof can be used for voice detection.

What is claimed is:

1. A voice detection apparatus, comprising:
   a light source unit which emits a light;
   at least one reflection plate located on facial parts of a person,
   the light is directed in the direction of the at least one reflection plate;
   a position detection section which receives the light reflected from the at least one reflection plate; and
   a voice detection section for determining the voice of a person based in part by extracting one or more features relating to the person uttering a vocal sound corresponding to positional information provided by the position detection section.

2. A voice detection apparatus comprising:
   a position detection sensor for receiving a specularly reflected light spot moving as a speaker utters a vocal sound,
   an output coordinates calculation section for calculating a coordinates position of the specularly reflected light spot,
   a feature extraction section for extracting a one or more features relating to the speaker uttering a vocal sound from information of the coordinates position or time characteristic of the coordinates position,
   a standard pattern storage section for previously storing standard patterns of the features obtained from the coordinates position of the specularly reflected light spot or time characteristic of the coordinates position, and
   a comparison section for comparing a signal from said feature extraction section with the standard patterns of said features stored in said standard pattern storage section.

3. The voice detection apparatus of claim 2, wherein said feature extraction section detects a stop point from time characteristic of the coordinates position of the specularly reflected light spot and extracts the features from the stop point.

4. The voice detection apparatus of claim 3, further comprising:
   a plurality of said specular reflection plates attached to the skin portion of vocal organs and periphery thereof of the speaker, and
   discrimination means for discriminating the specularly reflected light spots specularly reflected from said specular reflection plates from each other, wherein the features are extracted from the relationship between the coordinate positions calculated from the specularly reflected light spots discriminated from each other.

5. The voice detection apparatus of claim 4, wherein a plurality of position detection sensors are used to separate and detect a plurality of specularly reflected light spots from said specular reflection plates.

6. The voice detection apparatus of claim 4, wherein said light source section for applying light to said specular reflection plates includes a plurality of light sources, and the light sources respectively share the load of applying light to sets into which said specular reflection plates are grouped.

7. The voice detection apparatus of claim 6, wherein said light source section includes a plurality of light sources having different spectral characteristics.

8. The voice detection apparatus of claim 6, further comprising:
   a switching circuit for blinking said plurality of light sources of said light source section in sequence.

9. The voice detection apparatus of claim 4, wherein said plurality of specular reflection plates have different spectral reflection characteristics.

10. The voice detection apparatus of claim 2, further comprising:
    a light source section for generating a ray of visible light, infrared light, or ultraviolet light and applying the ray of light to a skin portion of vocal organs and periphery thereof of the speaker, and
    a specular reflection plate being attached to the skin of vocal organs and periphery thereof of the speaker for specularly reflecting the ray of light so that the specularly reflected light spot is formed.

11. The voice detection apparatus of claim 10, wherein said position detection sensor and said light source section are integral in one piece to be mounted on a head of the speaker.

12. The voice detection apparatus of claim 10, wherein said position detection sensor for receiving the specularly reflected light spot specularly reflected by said specular reflection plate attached to a median of the skin of vocal organs and periphery thereof of the speaker is a one-dimensional position detection sensor.

13. The voice detection apparatus of claim 10, wherein said position detection sensor for receiving the specularly reflected light spot specularly reflected by said specular reflection plate attached to a position deviating from a median of the skin of vocal organs and periphery thereof of the speaker is a two-dimensional position detection sensor.

14. The voice detection apparatus of claim 13, wherein said two-dimensional position detection sensor comprises;
    a pair of a screen, and
    a two-dimensional CCD camera for photographing the specularly reflected light spot projected on the screen, and wherein
    a position of the specularly reflected light spot is calculated from CCD sensor output.

15. The voice detection apparatus of claim 10, wherein the position of attaching said specular reflection plate to the skin of vocal organs and periphery thereof of the speaker is contained in at least one of a regio suprahyoidea, a trigonum submandibulare, a trigonum caroticum, a regio cervicalis mediana of the speaker.

16. The voice detection apparatus of claim 10, wherein the positions of attaching said specular reflection plates to the skin of vocal organs and periphery thereof of the speaker are a lip median inner peripheral upper part and a lip median inner peripheral lower part of the speaker.

17. The voice detection apparatus of claim 10, wherein the positions of attaching said specular reflection plates to the skin of vocal organs and periphery thereof of the speaker are a lip median outer peripheral upper part and a lip median outer peripheral lower part of the speaker.

18. A method for detecting language of a speaker comprising:

emitting a light toward at least one reflection plate placed on the speaker;

deflecting the light off the at least one reflection plate while the speaker is speaking;

receiving the light reflected off the at least one reflection plate onto a position detection section;

extracting a feature or features from information of a coordinate position or time characteristic of the coordinate position from a feature extraction section;

storing standard patterns of the features obtained from the coordinate positions of the light reflected onto the position detection section or time characteristics of the coordinate positions in a standard pattern storage section;

comparing a signal from the feature extraction section with the feature standard patterns stored in the standard pattern storage section; and determining the language or speech of a speaker according to an evaluation of the compared signal.

* * * * *